US011790325B2

(12) United States Patent
Hatta et al.

(10) Patent No.: US 11,790,325 B2
(45) Date of Patent: Oct. 17, 2023

(54) OPERATION SUPPORT DEVICE AND OPERATION SUPPORT METHOD

(71) Applicant: Mitsubishi Electric Corporation, Tokyo (JP)

(72) Inventors: Natsumi Hatta, Tokyo (JP); Takumi Suda, Tokyo (JP); Eiji Imamura, Tokyo (JP); Wataru Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 314 days.

(21) Appl. No.: 16/973,774

(22) PCT Filed: Jun. 11, 2019

(86) PCT No.: PCT/JP2019/023122
§ 371 (c)(1),
(2) Date: Dec. 10, 2020

(87) PCT Pub. No.: WO2019/244718
PCT Pub. Date: Dec. 26, 2019

(65) Prior Publication Data
US 2021/0248567 A1  Aug. 12, 2021

(30) Foreign Application Priority Data

Jun. 18, 2018  (JP) ................................. 2018-115537

(51) Int. Cl.
| *G06Q 10/20* | (2023.01) |
| *B01D 65/02* | (2006.01) |
| *C02F 1/00* | (2023.01) |
| *C02F 1/44* | (2023.01) |
| *G05B 13/04* | (2006.01) |
(Continued)

(52) U.S. Cl.
CPC ............ *G06Q 10/20* (2013.01); *B01D 65/02* (2013.01); *C02F 1/008* (2013.01); *C02F 1/44* (2013.01);
(Continued)

(58) Field of Classification Search
CPC ............. G06Q 10/20; G06Q 10/06313; G06Q 10/06395; G06Q 10/30; G06Q 50/06;
(Continued)

(56) References Cited

FOREIGN PATENT DOCUMENTS

| IN | 1087/CHE/2010 A | 8/2010 |
| JP | 2006-21093 A | 1/2006 |
(Continued)

OTHER PUBLICATIONS

Aipeng Jiang, Haokun Wang, Yinghui Lin, Wen Cheng, and Jian Wang, "A study on optimal schedule of membrane cleaning and replacement for spiral-wound SWRO system," Desalination 404 (2017) 259-269, Feb. 17, 2017 (Year: 2017).*
(Continued)

*Primary Examiner* — Jan P Mincarelli
(74) *Attorney, Agent, or Firm* — XSENSUS LLP

(57) ABSTRACT

An operation support device includes a computation unit that: calculates cost of separation treatment that depends on deterioration of a separation membrane using a cleaning efficiency model expressing deterioration of the separation membrane relative to the number of cleaning events, the separation membrane being configured to remove removal target from sewage; calculates operation cost using the cost of separation treatment, cleaning cost for one cleaning event for the separation membrane, and replacement cost for one replacement event for the separation membrane; determines, based on the operation cost, a first reference value used for determining whether to clean the separation membrane and a second reference value used for determining whether to replace the separation membrane; and calculates cleaning schedule and replacement schedule for the separation membrane using the first reference value and the second reference value determined.

9 Claims, 16 Drawing Sheets

(51) Int. Cl.
*G06Q 10/0631* (2023.01)
*G06Q 10/0639* (2023.01)
*G06Q 10/30* (2023.01)
*G06Q 50/06* (2012.01)

(52) U.S. Cl.
CPC ..... *G05B 13/042* (2013.01); *G06Q 10/06313* (2013.01); *G06Q 10/06395* (2013.01); *G06Q 10/30* (2013.01); *C02F 2303/16* (2013.01); *G06Q 50/06* (2013.01)

(58) Field of Classification Search
CPC ........ B01D 65/02; B01D 65/08; B01D 61/12; B01D 61/22; B01D 65/10; C02F 1/008; C02F 1/44; C02F 2303/16; C02F 2209/006; G05B 13/042; Y02W 30/82; Y02W 90/00
See application file for complete search history.

(56) References Cited

FOREIGN PATENT DOCUMENTS

| | | |
|---|---|---|
| JP | 2009-580 A | 1/2009 |
| JP | 2014-237072 A | 12/2014 |

OTHER PUBLICATIONS

Office Action dated May 23, 2022, in corresponding Korean patent Application No. 10-2020-7035550, 11 pages.
Indian Office Action dated Feb. 1, 2022, in corresponding Indian Patent Application No. 202027052556.
International Search Report and Written Opinion dated Sep. 10, 2019, received for PCT Application No. PCT/JP2019/023122, Filed on Jun. 11, 2019, 9 pages including English Translation.

* cited by examiner

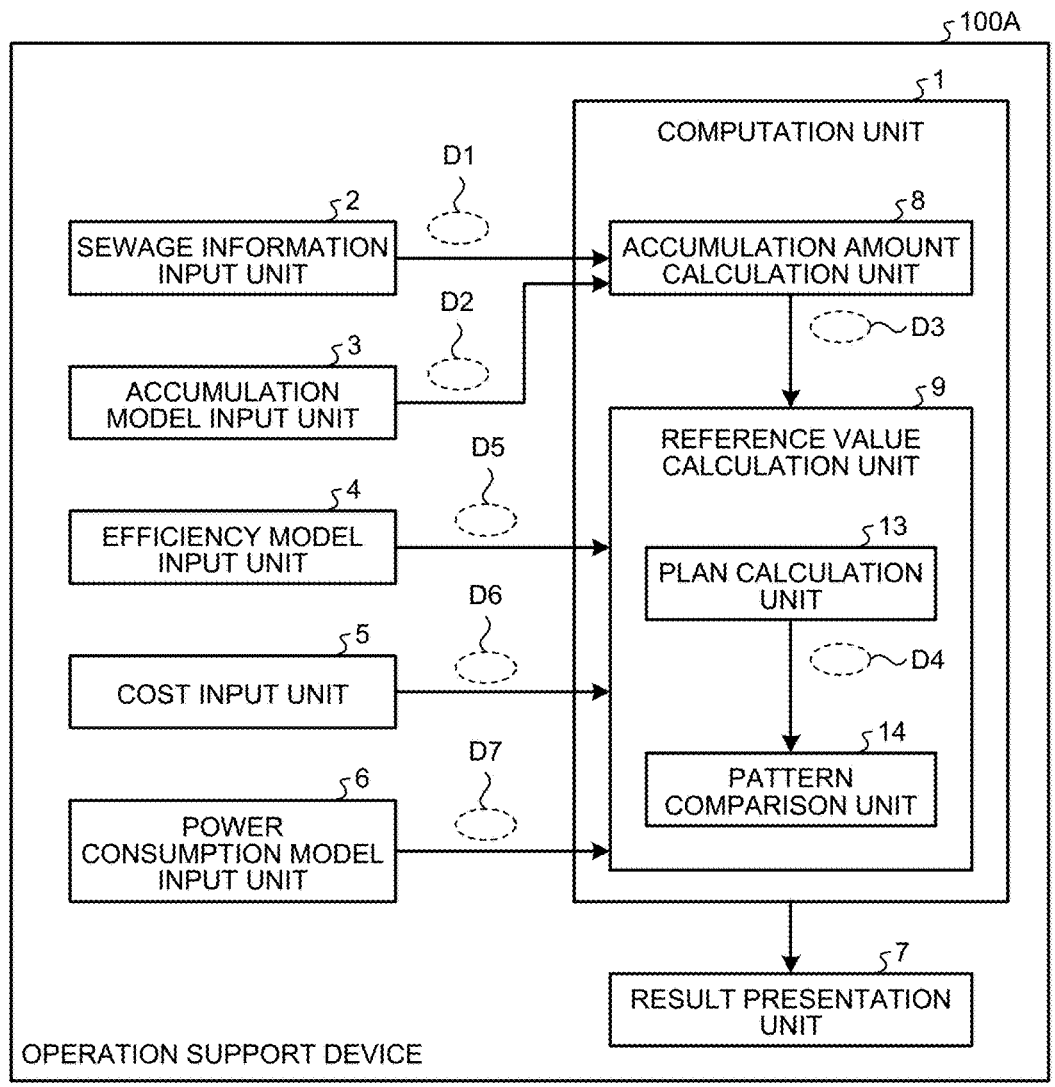

| PERIOD | PATTERN | NUMBER OF CLEANING EVENTS | NUMBER OF REPLACEMENT EVENTS | ELECTRICITY EXPENSE | PATTERN OPERATION COST |
|---|---|---|---|---|---|
| 240 | PATTERN A | 7 | 1 | 1410 | 5910 |
| | PATTERN E | 6 | 0 | 1462 | 4462 |
| | PATTERN I | 4 | 1 | 1476 | 4476 |
| 300 | PATTERN A | 9 | 1 | 1760 | 7260 |
| | PATTERN E | 6 | 1 | 1825 | 5825 |
| | PATTERN I | 5 | 1 | 1704 | 5204 |

FIG.5

```
MEMBRANE CLEANING TIMING:WHEN MEMBRANE IS XX% BLOCKED
MEMBRANE REPLACEMENT TIMING:WHEN TRANSMEMBRANE
PRESSURE DIFFERENCE AFTER CLEANING REACHES YY% OR MORE

SCHEDULE OF CLEANING AHEAD:Za DAYS LATER, Zb DAYS LATER,
AND Zc DAYS LATER
SCHEDULE OF REPLACEMENT AHEAD:Zd DAYS LATER, Ze DAYS
LATER, AND Zf DAYS LATER
```

FIG.9

| BLOWER OUTPUT | a | b | d | CLEANING REFERENCE VALUE | REPLACEMENT REFERENCE VALUE | REPLACEMENT CYCLE | PATTERN OPERATION COST |
|---|---|---|---|---|---|---|---|
| 50 | 20 | 0.90 | 30 | 0.9 | 0.7 | 44 | 12130 |

FIG.10

| NUMBER OF CALCULATIONS | BLOWER OUTPUT | a | b | d | CLEANING REFERENCE VALUE | REPLACEMENT REFERENCE VALUE | REPLACEMENT CYCLE | PATTERN OPERATION COST |
|---|---|---|---|---|---|---|---|---|
| 1 | 50 | 20 | 0.90 | 30 | 0.9 | 0.7 | 44 | 12130 |
| 2 | 60 | 20 | 0.85 | 35 | 0.9 | 0.7 | 48 | 12245 |
| 3 | 70 | 20 | 0.80 | 40 | 0.8 | 0.7 | 50 | 12866 |
| 4 | 80 | 20 | 0.75 | 45 | 0.8 | 0.7 | 54 | 12053 |
| 5 | 85 | 20 | 0.70 | 50 | 0.9 | 0.7 | 59 | 12175 |

FIG.13

| BLOWER OUTPUT | a | d | CLEANING REFERENCE VALUE | REPLACEMENT REFERENCE VALUE | REPLACEMENT CYCLE | PATTERN OPERATION COST |
|---|---|---|---|---|---|---|
| 50 | 40 | 30 | 0.9 | 0.7 | 40 | 12729 |

FIG.14

| NUMBER OF CALCULATIONS | BLOWER OUTPUT | a | d | CLEANING REFERENCE VALUE | REPLACEMENT REFERENCE VALUE | REPLACEMENT CYCLE | PATTERN OPERATION COST |
|---|---|---|---|---|---|---|---|
| 1 | 80 | 40 | 30 | 0.9 | 0.7 | 40 | 12729 |
| 2 | 90 | 35 | 40 | 0.9 | 0.7 | 44 | 13157 |
| 3 | 100 | 30 | 50 | 0.8 | 0.7 | 50 | 13619 |
| 4 | 110 | 25 | 60 | 0.9 | 0.7 | 59 | 12559 |
| 5 | 120 | 20 | 70 | 0.7 | 0.7 | 67 | 12815 |

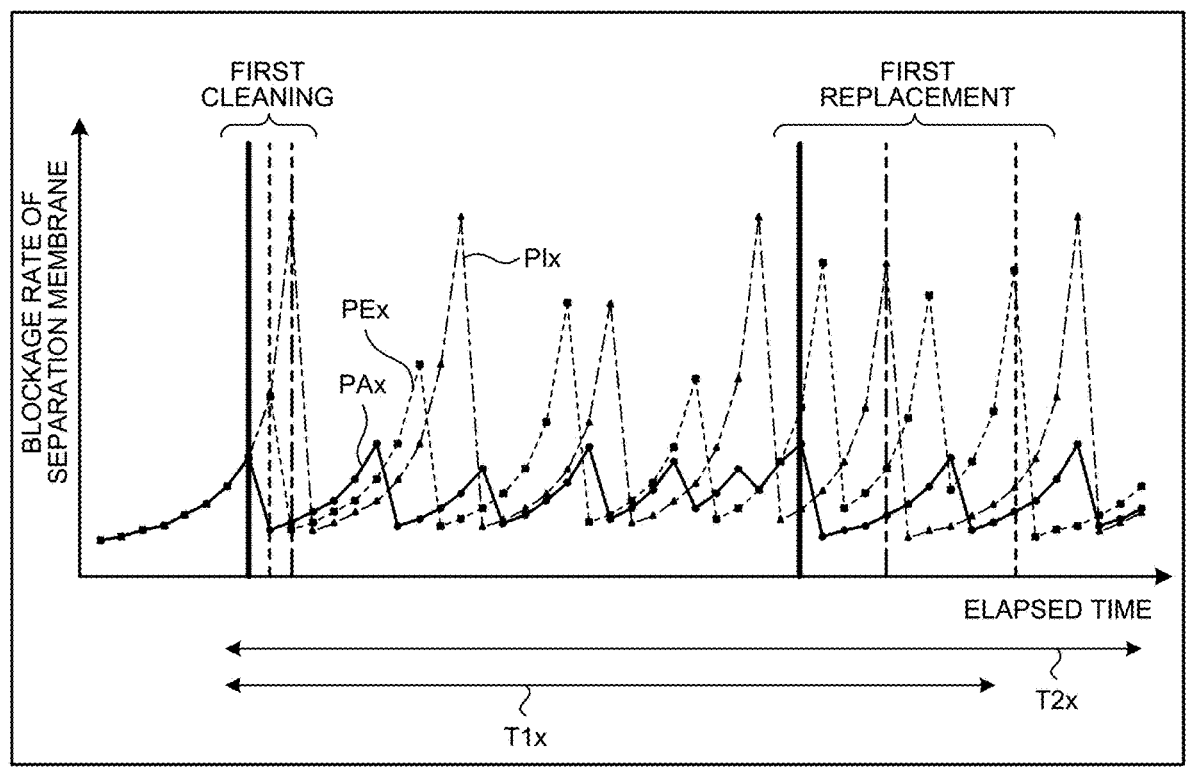

FIG.19

| PERIOD | PATTERN | NUMBER OF CLEANING EVENTS | NUMBER OF REPLACEMENT EVENTS | ELECTRICITY EXPENSE | OPERATION COST |
|---|---|---|---|---|---|
| 240 | PATTERN Ax | 7 | 1 | 1410 | 5910 |
| | PATTERN Ex | 6 | 0 | 1462 | 4462 |
| | PATTERN Ix | 4 | 1 | 1476 | 4476 |
| 300 | PATTERN Ax | 9 | 1 | 1760 | 7260 |
| | PATTERN Ex | 6 | 1 | 1825 | 5825 |
| | PATTERN Ix | 5 | 1 | 1704 | 5204 |

OPERATION SUPPORT DEVICE AND OPERATION SUPPORT METHOD

CROSS-REFERENCE TO RELATED APPLICATIONS

The present application is based on PCT filing PCT/JP2019/023122, filed Jun. 11, 2019, which claims priority to JP 2018-115537, filed Jun. 18, 2018, the entire contents of each are incorporated herein by reference.

FIELD

The present invention relates to an operation support device and an operation support method for supporting water treatment operation.

BACKGROUND

One of the sewage treatment methods is a membrane filtration method that removes a substance to be removed from inflow water by causing the substance to adhere to the membrane surface of a separation membrane. In the membrane filtration method, the filtration capacity decreases and the power consumption increases as the separation membrane is clogged. Therefore, the separation membrane is regularly cleaned until the separation membrane can no longer be reused due to repeated cleaning, in which case the separation membrane is replaced.

Because the membrane filtration method involves the cleaning cost for separation membranes and the replacement cost for separation membranes, there is a need to know the proper cleaning schedule and replacement schedule for separation membranes in order to achieve low-cost filtration. The operation support device described in Patent Literature 1 calculates the separation membrane filtration time and cleaning time for reducing the operation cost of the membrane filtration treatment device based on the operation information on the membrane filtration treatment device, and predicts the replacement schedule for separation membranes based on the calculation result.

CITATION LIST

Patent Literature

Patent Literature 1: Japanese Patent Application Laid-open No. 2009-000580

SUMMARY

Technical Problem

However, in the technique of Patent Literature 1, a reference value for determining whether to clean a separation membrane and a reference value for determining whether to replace a separation membrane need to be input by the user of the operation support device. Obtaining these reference values requires specialized knowledge of the membrane filtration method, so it is not possible to easily calculate the cleaning schedule and replacement schedule for separation membranes for reducing the operation cost of separation membranes.

The present invention has been made in view of the above, and an object thereof is to obtain an operation support device capable of easily calculating the cleaning schedule and replacement schedule for separation membranes for reducing the operation cost of separation membranes.

Solution to Problem

In order to solve the above problem and achieve an object, an operation support device according to an aspect of the present invention includes a computer to: calculate a cost of separation treatment that depends on a deterioration of a separation membrane using a cleaning efficiency model that expresses a deterioration of the separation membrane relative to the number of cleaning events, the separation membrane being configured to remove a removal target from sewage; calculate an operation cost using the cost of separation treatment, a cleaning cost for one cleaning event for the separation membrane, and a replacement cost for one replacement event for the separation membrane, the operation cost being a sum of the cost of separation treatment, a cleaning cost for the separation membrane, and a replacement cost for the separation membrane in an operation period of the separation membrane; determine a first reference value and a second reference value based on the operation cost, the first reference value being used for determining whether to clean the separation membrane, the second reference value being used for determining whether to replace the separation membrane; and calculate a cleaning schedule and a replacement schedule for the separation membrane using the first reference value and the second reference value determined.

Advantageous Effects of Invention

The present invention can achieve the effect of easily calculating the cleaning schedule and replacement schedule for separation membranes for reducing the operation cost of separation membranes.

BRIEF DESCRIPTION OF DRAWINGS

FIG. 1 is a functional configuration diagram of an operation support device according to a first embodiment.

FIG. 2 is a diagram illustrating an example of a pattern set used in the operation support device according to the first embodiment.

FIG. 5 is a diagram illustrating an example of a presentation screen presented by the operation support device according to the first embodiment.

FIG. 9 is a diagram for explaining the replacement cycle calculated by the operation support device according to the second embodiment without changing the operating condition.

FIG. 10 is a diagram for explaining the replacement cycles calculated by the operation support device according to the second embodiment by changing the operating condition.

FIG. 13 is a diagram for explaining the replacement cycle calculated by the operation support device according to the third embodiment without changing the operating condition.

FIG. 14 is a diagram for explaining the replacement cycles calculated by the operation support device according to the third embodiment by changing the operating condition.

FIG. 17 is a diagram illustrating an example of a temporary reference value pattern set used in the operation support device according to the fourth embodiment.

FIG. 18 is a diagram illustrating an example of a time-series change of the blockage rate calculated by the operation support device according to the fourth embodiment.

FIG. 19 is a diagram illustrating the relationship between calculation periods used by the operation support device according to the fourth embodiment to calculate pattern operation costs and calculation results of pattern operation costs.

DESCRIPTION OF EMBODIMENTS

Figures 3, 4:
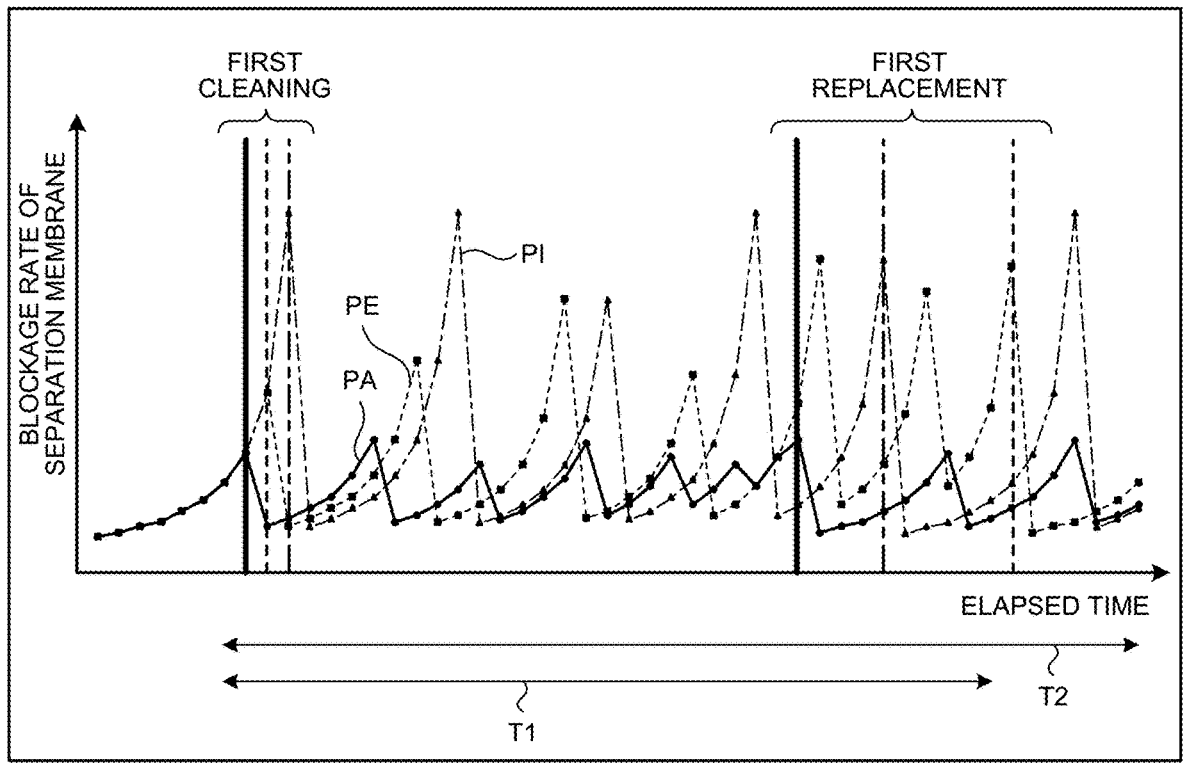
FIG. 3 is a diagram illustrating an example of a time-series change of the blockage rate calculated by the operation support device according to the first embodiment.
FIG. 4 is a diagram illustrating the relationship between calculation periods used by the operation support device according to the first embodiment to calculate pattern operation costs and calculation results of pattern operation costs.

Hereinafter, embodiments of an operation support device and an operation support method according to the present invention will be described in detail with reference to the drawings. The present invention is not limited to the embodiments.

First Embodiment

FIG. 1 is a functional configuration diagram of an operation support device according to the first embodiment. The operation support device 100A, which is a water treatment operation support device, is a computer that predicts the cleaning schedule and replacement schedule for separation membranes for reducing the operation cost of separation membranes used in water treatment such as sewage treatment. A separation membrane is a membrane that removes a removal target from sewage by filtration. In the following description, separation membranes may be referred to as membranes. The cleaning schedule and replacement schedule for separation membranes may be referred to as the maintenance schedule.

The operation support device 100A includes a computation unit 1, a sewage information input unit 2, an accumulation model input unit 3, an efficiency model input unit 4, a cost input unit 5, a power consumption model input unit 6, and a result presentation unit 7.

The sewage information input unit 2, the accumulation model input unit 3, the efficiency model input unit 4, the cost input unit 5, and the power consumption model input unit 6 acquire data and input data to the computation unit 1. Each of these input units may acquire data by any means. Each input unit acquires data by manual data input, data input from external software, input of data acquired from a sensor, or the like. Each input unit may input data to the computation unit 1 by any means such as network communication or media transfer.

The sewage information input unit 2 acquires a predicted water quality value D1 that is water quality information on the sewage to be subjected to water treatment, and inputs the predicted water quality value D1 to the computation unit 1. The predicted water quality value D1 is data indicating a predicted value of the water quality of sewage.

The accumulation model input unit 3 acquires an accumulation model D2 that expresses the amount of foulant accumulation, and inputs the accumulation model D2 to the computation unit 1. The accumulation model D2 is a model that expresses the amount of foulant accumulation caused by fouling. Fouling is a phenomenon in which a substance to be separated contained in sewage physically or chemically adheres to the membrane surface of a separation membrane. Foulant is a substance adhered to the membrane surface of a separation membrane.

The efficiency model input unit 4 acquires a cleaning efficiency model D5 that is a model of cleaning efficiency, and inputs the cleaning efficiency model D5 to the computation unit 1. The cleaning efficiency model D5 is a model that expresses the deterioration of a separation membrane relative to the number of cleaning events. In the membrane filtration method, a separation membrane is clogged through continuous use of the separation membrane, and thus the efficiency of filtration treatment decreases as the treatment time elapses. In the membrane filtration method, it is necessary to clean and replace separation membranes on a regular basis in order to regularly remove foulant from membranes. In the cleaning of a separation membrane, the separation membrane is cleaned with a chemical solution or filtrate so that foulant is removed. Generally, the cleaning cost for separation membranes is lower than the replacement cost for separation membranes. Therefore, the first step for dealing with clogging of a separation membrane is to clean the separation membrane. After the separation membrane is cleaned, the filtration capacity of the separation membrane is recovered. However, the filtration capacity of the cleaned separation membrane is lower than that of a new separation membrane, and the durability of the separation membrane is also reduced. As the number of times the separation membrane is cleaned increases, the recovery rate of the filtration capacity and the durability of the separation membrane decrease. When the recovery rate of the filtration capacity or the durability of the separation membrane becomes so low that the separation membrane can no longer be reused, the separation membrane is replaced. The cleaning efficiency model D5 of the present embodiment expresses the recovery rate of the filtration capacity and the durability of the separation membrane relative to the number of times the separation membrane is cleaned.

The cost input unit 5 acquires a maintenance cost D6, and inputs the maintenance cost D6 to the computation unit 1. The maintenance cost D6 is the cost required for the maintenance of separation membranes, and includes the cleaning cost required for one cleaning event for a separation membrane and the replacement cost required for one replacement event for a separation membrane.

The power consumption model input unit 6 acquires a power consumption model D7, and inputs the power consumption model D7 to the computation unit 1. The power consumption model D7 is a model that expresses the power consumption of the water treatment facility with respect to the blockage rate of a separation membrane. In the following description, one or more of the accumulation model D2, the cleaning efficiency model D5, and the power consumption model D7 may be referred to as a model.

The computation unit 1 computes a reference value used for calculating the maintenance schedule for separation membranes. The maintenance of a separation membrane is exemplified by the cleaning of a separation membrane and the replacement of a separation membrane. The reference value is exemplified by a value of the blockage rate of a separation membrane. The following description is based on the premise that the reference value is a blockage rate.

The computation unit 1 uses the cost of separation treatment that depends on the deterioration of a separation membrane and the maintenance cost D6 to determine the reference value such that the operation cost, i.e. the sum of the cost of separation treatment, the cleaning cost, and the replacement cost during the operation of separation membranes, has the minimum value, and calculates the cleaning schedule and replacement schedule for separation membranes using the determined reference value. The cost of separation treatment is a cost such as the electricity expense per unit time required for a separation membrane to perform separation treatment. The computation unit 1 calculates the cost of separation treatment using the cleaning efficiency model D5. The computation unit 1 includes an accumulation amount calculation unit 8 and a reference value calculation unit 9, and outputs computation results to the result presentation unit 7.

The accumulation amount calculation unit 8 uses the predicted water quality value D1 and the accumulation model D2 to calculate a time-series change D3 of the fouling accumulation amount that occurs thereafter. The time-series change D3 is data indicating a temporal change in the fouling accumulation amount, which is the amount of foulant accumulation. The accumulation amount calculation unit 8 sends the time-series change D3 to the reference value calculation unit 9.

The reference value calculation unit 9 includes a plan calculation unit 13 and a pattern comparison unit 14. The plan calculation unit 13 calculates a plan set D4 for separation membranes that shows plans for cleaning and plans for replacement. Specifically, the plan calculation unit 13 calculates the plan set D4 using the cleaning efficiency model D5, the maintenance cost D6, and the time-series change D3. At this time, the plan calculation unit 13 calculates the plan set D4 in accordance with a pattern set P (wsh, cng). The pattern set P (wsh, cng) is a set of combination patterns of a cleaning reference value which is a first reference value for determining whether to clean a separation membrane and a replacement reference value which is a second reference value for determining whether to replace a separation membrane. Here, wsh is a cleaning reference value and cng is a replacement reference value. The pattern set P (wsh, cng) is set before the maintenance schedule for separation membranes is calculated. In the following description, the pattern set P (wsh, cng) is referred to as the pattern set P.

In the following description, a combination pattern of a cleaning reference value and a replacement reference value may be referred to as a reference value pattern. That is, membrane maintenance reference values, which are reference values for determining whether to perform maintenance of separation membranes, may be referred to as a reference value pattern.

The plan set D4 is maintenance plans that specify the cleaning schedule and replacement schedule for separation membranes. Therefore, the plan set D4 can also be interpreted as separation membrane operation plans. The cleaning schedule is represented by the date and time of a separation membrane cleaning event or the elapsed time from the start of filtration treatment to a cleaning event. The replacement schedule is represented by the date and time of a separation membrane replacement event or the elapsed time from the start of filtration treatment to a replacement event. The plan set D4 is a list of the cleaning schedule and replacement schedule specified by the time-series change D3 for each reference value pattern.

In a case where filtration treatment with separation membranes, cleaning, and replacement are performed in accordance with each reference value pattern included in the pattern set P, the cleaning schedule and the replacement schedule vary between reference value patterns. The plan calculation unit 13 calculates, as the plan set D4, the cleaning schedule and the replacement schedule that are based on a combination of a cleaning reference value and a replacement reference value. The plan calculation unit 13 sends the calculated plan set D4 to the pattern comparison unit 14.

The pattern comparison unit 14 uses the plan set D4 and the power consumption model D7 to calculate the operation cost required when a reference value pattern is applied to each separation membrane in a certain period. In the following description, the operation cost required when a reference value pattern is applied to separation membranes is referred to as a pattern operation cost. A pattern operation cost includes the total cost of the cleaning cost and the replacement cost and the cost of separation treatment such as the electricity expense for filtration. The sum of the cleaning cost and the replacement cost is the cost required for the maintenance of separation membranes, and the electricity expense for filtration is the running cost of separation membranes. The cleaning cost includes the cost of the cleaning liquid and the like, and the replacement cost includes the price of separation membranes.

Here, the reliability of a calculation result improves as the period used for calculating a pattern operation cost becomes longer. In other words, if the period for comparing pattern operation costs is too short, a non-optimal reference value pattern may be adopted. Therefore, the pattern comparison unit 14 compares operation costs for reference value patterns in a period including at least one separation membrane replacement event after starting the use of a separation membrane or in a period including at least two separation membrane replacement events. In other words, the pattern comparison unit 14 compares operation costs in a period longer than the replacement cycle for separation membranes.

The pattern comparison unit 14 calculates a pattern operation cost for each reference value pattern in the pattern set P. The pattern comparison unit 14 compares the calculated pattern operation costs and determines the minimum pattern operation cost. The pattern comparison unit 14 extracts, from the pattern set P, the reference value pattern used for the calculation of the minimum pattern operation cost. The pattern comparison unit 14 sends the minimum pattern operation cost and the extracted reference value pattern to the result presentation unit 7.

The result presentation unit 7 presents the user with the minimum pattern operation cost and the reference value pattern that achieves the minimum pattern operation cost. The presentation means by the result presentation unit 7 may be any means such as displaying on a display or printing on paper.

Next, each calculation performed by the accumulation amount calculation unit 8, the plan calculation unit 13, and the pattern comparison unit 14 will be described using a specific example. The fouling accumulation amount is proportional to the inflow load of sewage. Therefore, in a case where the predicted water quality value D1 of the input load is $X_t$ and a proportional expression is used as the accumulation model D2, the time-series change D3 of the fouling accumulation amount V(t) that is calculated by the accumulation amount calculation unit 8 is expressed as Formula (1) below. In Formula (1), "a" is a proportional constant.

[Math. 1]

$$V(t)=a*X_t \quad \text{Formula (1)}$$

Further, because the accumulation amount calculation unit 8 can calculate the blockage rate of a separation membrane using the fouling accumulation amount, the blockage rate can be used as a cleaning reference value and a replacement reference value for separation membranes. In a case where a proportional expression with respect to the fouling accumulation amount is used as a calculation model for the blockage rate of a separation membrane, the blockage rate R(t) of a separation membrane can be expressed as Formula (2) below. In Formula (2), "b" is a proportional constant.

[Math. 2]

$$R(t)=b*V(t) \quad \text{Formula (2)}$$

Instead of a proportional expression such as Formula (2) that is used here for simplicity, Ruth's equation represented by Formula (3) below or past data on water quality changes may be used for the accumulation model D2. In Formula (3), Vf is the total amount of filtrate, A is the membrane area of the separation membrane, k is a resistance coefficient, Pf is the transmembrane pressure difference during filtration, c is a cake ratio, μ is the viscosity coefficient of water, and $V_0$ is a filtration constant. The transmembrane pressure difference is the pressure difference between the primary side, which is the sewage side relative to the separation membrane, and the secondary side, which is the filtrate side relative to the separation membrane.

[Math. 3]

$$\frac{dVf}{dt} = \frac{A^2 * k * Pf}{(c*\mu*(Vf+V_0))} \quad \text{Formula (3)}$$

The plan calculation unit 13 calculates the plan set D4 for separation membranes using Formula (1), the pattern set P set in advance, and the cleaning efficiency model D5. The cleaning efficiency model D5 can express the phenomenon that a separation membrane deteriorates due to repeated cleaning by considering the efficiency of separation membrane cleaning. If the efficiency of separation membrane cleaning is not considered, that is, if the efficiency of cleaning is always 100%, a separation membrane will always recover by cleaning to the same level as a new one regardless of the number of repetitions of separation membrane cleaning. This means that the separation membrane need not be replaced, which is not the case. In a case where a model in which the efficiency of separation membrane cleaning decreases exponentially with respect to the number of cleaning events n for the separation membrane is used as the separation membrane cleaning efficiency model D5, the efficiency of separation membrane cleaning $R_{ef}(n)$ can be expressed as Formula (4) below. Here, "c" is the base of the exponential function.

[Math. 4]

$$R_{ef}(n)=c^n \quad \text{Formula (4)}$$

FIG. 2 is a diagram illustrating an example of a pattern set used in the operation support device according to the first embodiment. FIG. 2 depicts the combination of a blockage rate as a cleaning reference value and a blockage rate as a replacement reference value in each reference value pattern. In FIG. 2 and FIG. 4 described later, examples of reference value patterns are denoted by patterns A to I. Here, specific numerical examples of cleaning reference values and numerical examples of replacement reference values in patterns A to I are illustrated.

FIG. 3 is a diagram illustrating an example of a time-series change of the blockage rate calculated by the operation support device according to the first embodiment. FIG. 3 depicts a graph of the time-series change D3 of the blockage rate for the case that cleaning and replacement are performed using pattern A, pattern E, or pattern I of the reference value patterns illustrated in FIG. 2. The horizontal axis of the graph depicted in FIG. 3 represents the time that elapses after the separation membrane starts to filter sewage, and the vertical axis represents the blockage rate of the separation membrane corresponding to the transmembrane pressure difference.

The change transition of the blockage rate for pattern A is denoted by change transition PA, the change transition of the blockage rate for pattern E is denoted by change transition PE, and the change transition of the blockage rate for pattern I is denoted by change transition PI. Focusing on the first cleaning event, it can be seen that the cleaning in pattern A is performed at a stage where the blockage rate is low, and the cleaning in pattern I is performed at a stage where the blockage rate is high. The plan calculation unit 13 can formulate the plan set D4 based on the change transition of the blockage rate for the case that each reference value pattern is adopted.

The pattern comparison unit 14 uses the maintenance cost D6 and the power consumption model D7 to calculate the pattern operation cost for each plan included in the plan set D4. The pattern comparison unit 14 determines the minimum pattern operation cost of the calculated pattern operation costs, and acquires the reference value pattern corresponding to the minimum pattern operation cost. The pattern comparison unit 14 creates a maintenance plan based on the acquired reference value pattern. The maintenance plan created by the pattern comparison unit 14 includes the cleaning schedule for separation membranes and the replacement schedule for separation membranes.

In a case where a proportional expression with respect to the blockage rate is used as the power consumption model D7, the power consumption W(t) can be expressed as Formula (5) below. Here, "d" is a proportional constant.

[Math. 5]

$$W(t) = d*R(t) \quad \text{Formula (5)}$$

For calculating a pattern operation cost, the pattern comparison unit 14 determines the calculation period used for calculating the pattern operation cost. In this case, a calculation period sufficiently longer than the replacement cycle for separation membranes is used as described above. That is, the pattern comparison unit 14 sets the calculation period based on the replacement cycle for separation membranes. The replacement cycle for separation membranes is the period from the replacement event for a separation membrane to the next replacement event. As the calculation period, the pattern comparison unit 14 may use a period designated by an instruction from the user, or may use an initial value set in advance.

Here, the difference in determination result between the case of a short calculation period such as a calculation period T1 and the case of a calculation period T2 longer than the calculation period T1 will be described. An example of the calculation period T1 is 240 days, and an example of the calculation period T2 is 300 days. The present embodiment is based on the premise that the unit of periods is "day", but any unit of periods may be used such as "week" or "month".

FIG. 4 is a diagram illustrating the relationship between calculation periods used by the operation support device according to the first embodiment to calculate pattern operation costs and calculation results of pattern operation costs. The calculation results of FIG. 4 contain the calculation results for patterns A, E, and I in the case that the pattern operation cost calculation period is 240 days and the calculation results for patterns A, E, and I in the case that the pattern operation cost calculation period is 300 days. The calculation results here are "the number of cleaning events", "the number of replacement events", "electricity expense", and "pattern operation cost". "The number of cleaning events" is the number of times the separation membrane is cleaned. "The number of replacement events" is the number of times the separation membrane is replaced. "Electricity expense" is the electricity expense for the filtration treatment corresponding to the calculation period.

Determination results obtained using a short calculation period for pattern operation costs may differ from those obtained using a long calculation period for pattern operation costs. For example, in FIG. 4, the calculation period T1=240 days is shorter than the longest replacement cycle in the compared patterns. Specifically, calculation period T1< (replacement cycle for the case of pattern I) is satisfied. Therefore, the determination results differ between the case of the calculation period T1=240 days and the case of the calculation period T2=300 days. That is, pattern E has the minimum pattern operation cost in the case of the calculation period T1=240 days, whereas pattern I has the minimum pattern operation cost in the case of the calculation period T2=300 days.

Because the reliability of calculation results increases as the calculation period for pattern operation costs becomes longer, the reliability of the calculation results in the case of the calculation period T2=300 days is higher than that in the case of the calculation period T1=240 days. That is, pattern I is considered to have the minimum pattern operation cost. Therefore, the pattern comparison unit 14 does not adopt a calculation period, such as the calculation period T1=240 days, that makes the determination results different from those with the calculation period T2=300 days.

The pattern comparison unit 14 uses, as the calculation period for pattern operation costs, a length that is at least twice the longest replacement cycle in the reference value patterns such as patterns A to I to be compared. Note that it is desirable to extend the calculation period for pattern operation costs and recalculate pattern operation costs repeatedly until the determination results converge. The pattern comparison unit 14 compares the pattern operation costs calculated using a sufficiently long calculation period, and determines the reference value pattern that achieves the minimum pattern operation cost. Then, the result presentation unit 7 presents the reference value pattern that achieves the minimum pattern operation cost.

FIG. 5 is a diagram illustrating an example of a presentation screen presented by the operation support device according to the first embodiment. The result presentation unit 7 displays a timing such as "when the membrane is XX % blocked" as the cleaning timing for separation membranes. The result presentation unit 7 also displays a timing such as "when the transmembrane pressure difference after cleaning reaches YY % or more" as the replacement timing for separation membranes. The cleaning timing is a timing defined by a condition for cleaning, and the replacement timing is a timing defined by a condition for replacement.

The result presentation unit 7 also displays the reference value pattern. The result presentation unit 7 may display the calculation result in the form of converted values representing information to be presented to the operator of the water treatment facility. In this case, the pattern comparison unit 14 converts the calculation result into information to be presented to the operator of the water treatment facility. Converted values are, for example, the date of subsequent cleaning or replacement events, any cleaning plan and replacement plan other than the plan determined by the pattern comparison unit 14, and the cost for the case of executing the cleaning plan and replacement plan. For displaying the date of the next and subsequent cleaning or replacement events, the result presentation unit 7 displays the schedule of cleaning ahead such as "Za days later, Zb days later, and Zc days later", and the schedule of replacement ahead such as "Zd days later, Ze days later, and Zf days later".

Figure 6:
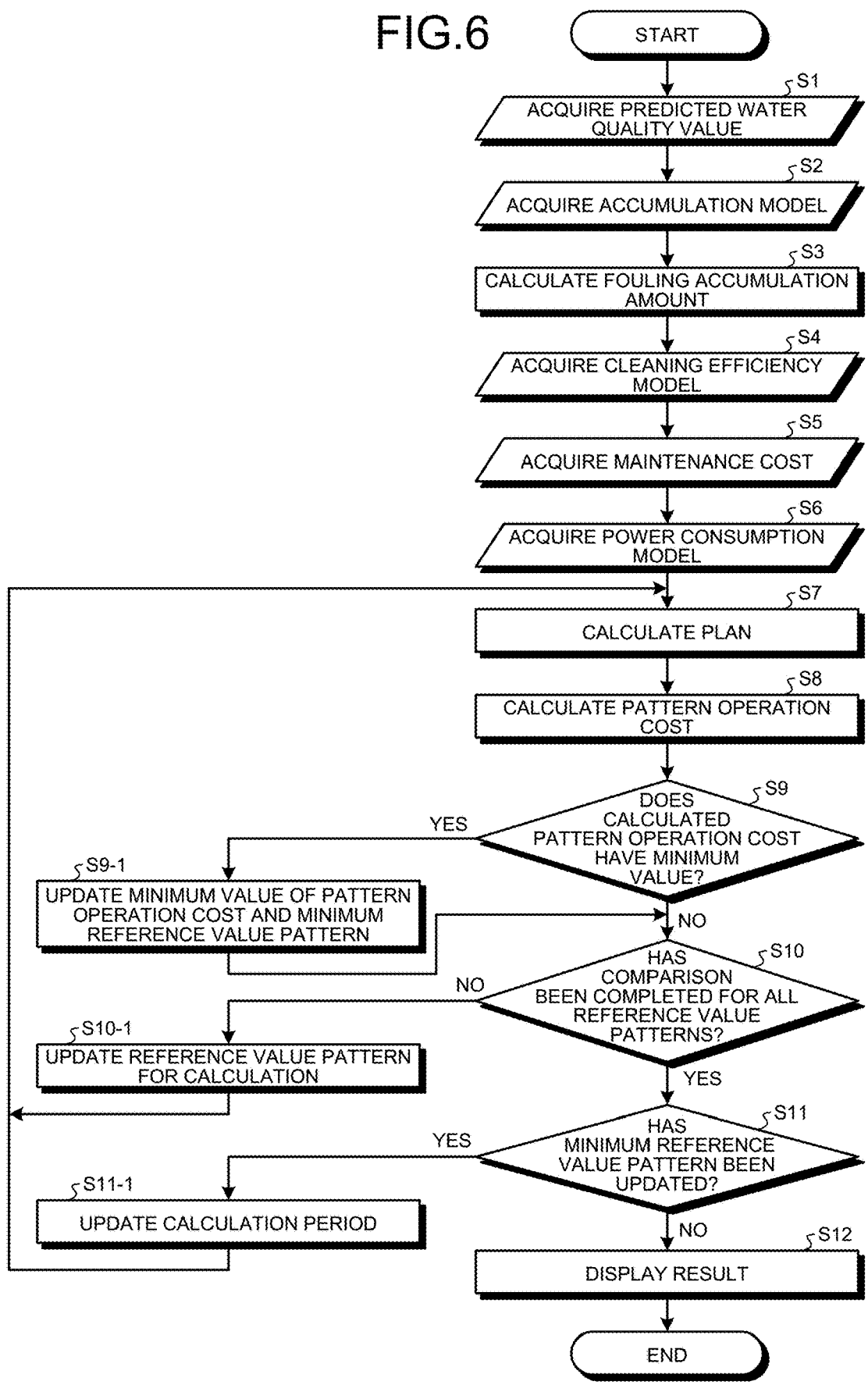
FIG. 6 is a flowchart illustrating the procedure for computation processing by a computation unit according to the first embodiment.

Next, the procedure for computation processing by the computation unit 1 will be described. FIG. 6 is a flowchart illustrating the procedure for computation processing by the computation unit according to the first embodiment. This procedure is the same as the procedure for the case that the computation unit 1 is executed as a program.

The operation support device 100A prepares the pattern set P of reference value patterns in advance before the computation unit 1 starts computation. The pattern set P includes various reference values. Further, the operation support device 100A determines the initial value of the calculation period in advance.

The computation unit 1 acquires the predicted water quality value D1, which is information on sewage, and the accumulation model D2 (steps S1 and S2). The computation unit 1 calculates the future time-series change D3 of the fouling accumulation amount based on the predicted water quality value D1 and the accumulation model D2 (step S3).

After that, the computation unit 1 acquires the separation membrane cleaning efficiency model D5, the maintenance cost D6, and the power consumption model D7 for the water treatment facility with respect to the blockage rate of a separation membrane (steps S4, S5, and S6). The computation unit 1 acquires the values of the first reference value pattern from the pattern set P, calculates a cleaning plan and a replacement plan that are plans in the calculation period (step S7), and calculates a pattern operation cost based on the calculated cleaning plan and replacement plan (step S8). Then, the computation unit 1 compares the value of the pattern operation cost calculated in step S8 with the minimum value of the pattern operation cost in the previous calculation results. The computation unit 1 determines whether the pattern operation cost calculated in step S8 has the minimum value (step S9).

When the pattern operation cost calculated in step S8 has the minimum value (step S9: Yes), the computation unit 1 updates and records the minimum value of the pattern operation cost and the reference value pattern used for the calculation of the minimum pattern operation cost (step S9-1). Note that in the case of the initial calculation of a pattern operation cost, the value of the pattern operation cost calculated in step S8 is necessarily the minimum value. The computation unit 1 performs step S10 after step S9-1.

When the pattern operation cost calculated in step S8 does not have the minimum value (step S9: No), the computation unit 1 determines whether there is a reference value pattern in the pattern set P for which the calculation of the pattern operation cost has not been completed. That is, the computation unit 1 determines whether the comparison with the minimum value has been completed for all the reference value patterns (step S10). When there is a reference value pattern for which the calculation has not been completed (step S10: No), the computation unit 1 acquires one reference value pattern for which the calculation has not been completed, and updates the reference value pattern for calculation (step S10-1). Then, the computation unit 1 uses the new reference value pattern to perform steps S7 to S10 again.

The computation unit 1 calculates the pattern operation costs for all the reference value patterns, and repeats steps S10-1 and S7 to S10 until the comparison between the calculated pattern operation costs and the minimum value is completed. After the pattern operation costs for all the reference value patterns are calculated and compared with the minimum value (step S10: Yes), the computation unit 1 determines whether the reference value pattern that achieves the minimum pattern operation cost in the calculation period for the calculation of the current pattern operation cost is the same as the reference value pattern having the minimum pattern operation cost in the calculation of the previous pattern operation cost. The minimum reference value pattern derived in the previous calculation is the minimum reference value pattern calculated in the previous loop of steps S7 to S10, and the reference value pattern derived in the current calculation is the minimum reference value pattern calculated in the current loop of steps S7 to S10. Hereinafter, they are referred to as minimum reference value patterns.

When the current minimum reference value pattern is different from the previous minimum reference value pattern, the computation unit 1 updates the latest minimum reference value pattern to the current minimum reference value pattern. The computation unit 1 determines whether the minimum reference value pattern has been updated (step S11).

In response to determining that the minimum reference value pattern has been updated (step S11: Yes), that is, the current minimum reference value pattern is different from the previous minimum reference value pattern, the computation unit 1 updates the current calculation period T to a new calculation period T'=(T+ΔT) (step S11-1). Then, the computation unit 1 executes steps S7 to S11 using the new calculation period T'.

In response to determining that the minimum reference value pattern has not been updated (step S11: No), that is, the current minimum reference value pattern is the same as the previous minimum reference value pattern, the computation unit 1 determines that the minimum reference value patterns have converged. Upon determining that the minimum reference value patterns have converged, the computation unit 1 sends the current or previous minimum reference value pattern to the result presentation unit 7. Thus, the result presentation unit 7 displays the current or previous minimum reference value pattern as a calculation result (step S1).

As described above, in the first embodiment, the reference value pattern is determined such that the pattern operation cost, i.e. the sum of the cost of separation treatment, the cleaning cost for separation membranes, and the replacement cost for separation membranes during the operation of separation membranes, has the minimum value, and the cleaning schedule and replacement schedule for separation membranes are calculated using the determined reference value pattern. This makes it possible to easily predict the cleaning schedule and replacement schedule for separation membranes for reducing the pattern operation cost of separation membranes without the need for reference value input based on specialized knowledge.

Second Embodiment

Next, the second embodiment of the present invention will be described with reference to FIGS. 7 to 10. In the first embodiment, the minimum reference value pattern is calculated with no change in the current operating situation of the water treatment facility. If this minimum reference value pattern does not satisfy the membrane maintenance condition required by the operator, it is desirable to change the operating condition of the water treatment facility such that it satisfies the membrane maintenance condition. In the second embodiment, therefore, the operating condition of the water treatment facility is changed so as to satisfy the membrane maintenance condition, and the minimum reference value pattern satisfying the membrane maintenance condition is calculated. The membrane maintenance condition is a condition for maintenance of separation membranes.

Figure 7:
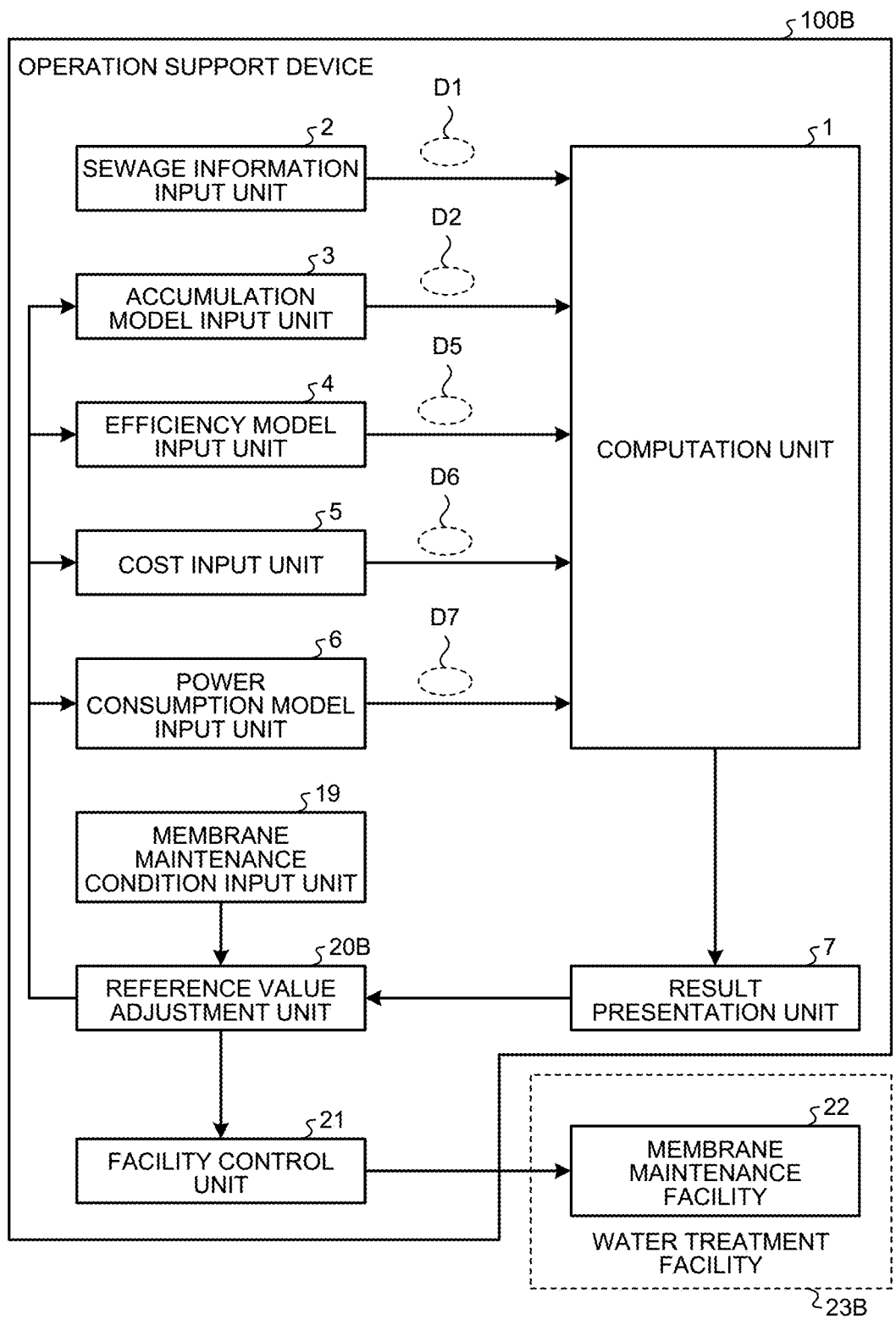
FIG. 7 is a functional configuration diagram of an operation support device according to a second embodiment.

FIG. 7 is a functional configuration diagram of an operation support device according to the second embodiment. Components of the operation support device 100B illustrated in FIG. 7 that achieve the same functions as those of the operation support device 100A of the first embodiment illustrated in FIG. 1 are denoted by the same reference signs, and duplicate descriptions are omitted.

The operation support device 100B includes a membrane maintenance condition input unit 19, a reference value adjustment unit 20B, and a facility control unit 21, in addition to the components provided in the operation support device 100A. The facility control unit 21 is connected to a water treatment facility 23B including a membrane maintenance facility 22.

The membrane maintenance condition input unit 19 acquires a membrane maintenance condition designated by the operator, and inputs the membrane maintenance condition to the reference value adjustment unit 20B. The membrane maintenance condition is exemplified by a replacement cycle representing the period to the replacement of a separation membrane. The membrane maintenance condition input unit 19 acquires data by manual data input, data input from external software, input of data acquired from a sensor, or the like.

The reference value adjustment unit 20B is connected to the result presentation unit 7, the membrane maintenance condition input unit 19, and the facility control unit 21. The reference value adjustment unit 20B is also connected to the accumulation model input unit 3, the efficiency model input unit 4, the cost input unit 5, and the power consumption model input unit 6.

The reference value adjustment unit 20B acquires the calculation result by the computation unit 1 from the result presentation unit 7. Specifically, the reference value adjustment unit 20B acquires the minimum reference value pattern and the maintenance schedule from the result presentation unit 7. The reference value adjustment unit 20B changes the operating condition of the water treatment facility 23B such that the minimum reference value pattern computed by the computation unit 1 satisfies the membrane maintenance condition. The operating condition is a condition that affects at least one of the accumulation model D2, the cleaning efficiency model D5, the maintenance cost D6, and the power consumption model D7. The reference value adjustment unit 20B here sets an operating condition that makes the maintenance schedule satisfy the membrane maintenance condition, and sends the set operating condition to the accumulation model input unit 3, the efficiency model input unit 4, the cost input unit 5, or the power consumption model input unit 6. For example, the reference value adjustment unit 20B sets a new accumulation model D2 and sends the set accumulation model D2 to the accumulation model input unit 3. The computation unit 1 recalculates the minimum reference value pattern using the changed operating condition.

As illustrated in FIG. 9, if the water treatment facility 23B is operated with the initial value of the blower output, the replacement cycle is 44 days, which is shorter than 51 days specified by the maintenance condition. That is, because the replacement cycle calculated with the initial value of the blower output is shorter than the replacement cycle specified by the maintenance condition, the initial value of the blower output does not satisfy the maintenance condition. In this case, the reference value adjustment unit 20B creates the accumulation model D2 and the power consumption model D7 for the case of increasing the blower output. The reference value adjustment unit 20B creates a new accumulation model D2 by updating "b" in Formula (2) and creates a new power consumption model D7 by updating "d" in Formula (5).

Upon determining the operating condition that makes the maintenance schedule satisfy the membrane maintenance condition, the reference value adjustment unit 20B inputs the determined operating condition to the facility control unit 21.

The facility control unit 21 controls the water treatment facility 23B. The facility control unit 21 of the present embodiment changes the operating condition of the membrane maintenance facility 22 in accordance with the operating condition from the reference value adjustment unit 20B. The membrane maintenance facility 22 is a facility or device for maintaining the state of separation membranes. An example of the membrane maintenance facility 22 is a blower that regulates the volume of aeration air on the membrane surface or a pump that regulates the concentration of the cleaning liquid used for membrane cleaning.

The operation support device 100B calculates the minimum reference value pattern and the maintenance schedule using a method similar to that of the operation support device 100A. Hereinafter, processing that is performed by the operation support device 100B after the operation support device 100B calculates the minimum reference value pattern and the maintenance schedule will be described. After calculating the minimum reference value pattern and the maintenance schedule, the operation support device 100B changes the operating condition such that it satisfies the membrane maintenance condition, and recalculates the minimum reference value pattern and the maintenance schedule.

Figure 8:
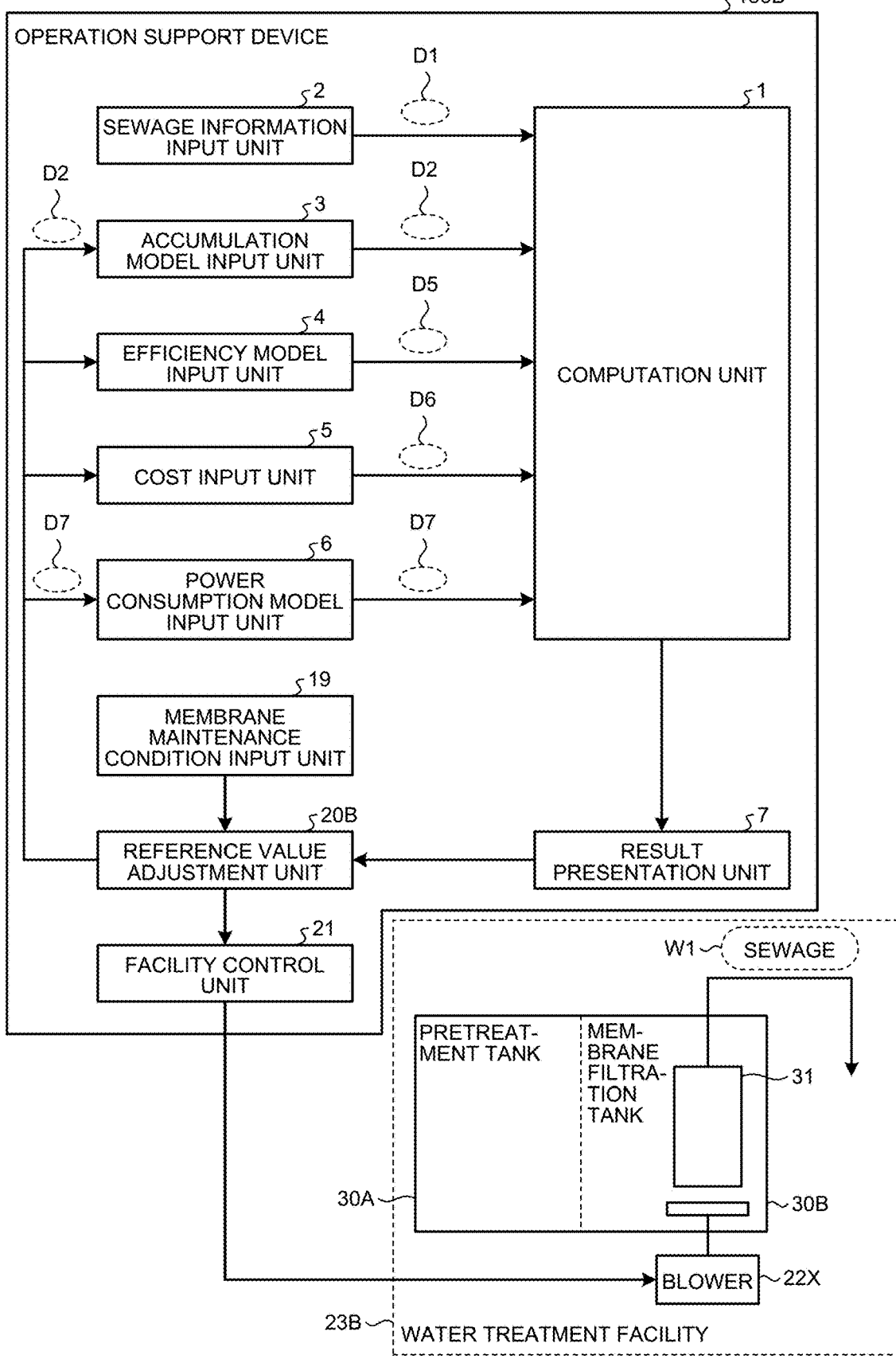
FIG. 8 is a diagram for explaining the process of changing the operating condition and the process of recalculating the minimum reference value pattern by the operation support device according to the second embodiment.

FIG. 8 is a diagram for explaining the process of changing the operating condition and the process of recalculating the minimum reference value pattern by the operation support device according to the second embodiment. Here, consider the case in which the membrane maintenance facility 22 is a blower 22X that performs membrane surface aeration, and the operation support device 100B changes the operating condition of the blower 22X such that the maintenance schedule satisfies the membrane maintenance condition.

The water treatment facility 23B includes a pretreatment tank 30A, a membrane filtration tank 30B, a separation membrane 31, and the blower 22X. The pretreatment tank 30A precipitates suspended matter contained in sewage W1 and then sends the sewage W1 to the membrane filtration tank 30B. The membrane filtration tank 30B includes the separation membrane 31, and the sewage W1 is filtered by the separation membrane 31. The blower 22X performs membrane surface aeration on the separation membrane 31. The membrane filtration tank 30B sends the filtered sewage W1 to the outside.

Generally, as the air volume of membrane surface aeration for the separation membrane 31, that is, the output of the blower 22X, increases, the increase of the amount of foulant accumulation becomes small. In addition, generally, as the output of the blower 22X increases, the amount of power consumption per unit time increases. Therefore, the operating condition that can be changed by changing the output of the blower 22X is the accumulation model D2 and the power consumption model D7. The following description is based on the premise that the accumulation model D2 and the power consumption model D7 that are the same as the models described in the first embodiment are adopted. That is, the operation support device 100B here uses Formulas (1) and (2) as the accumulation model D2 and uses Formula (5) as the power consumption model D7. The reference value adjustment unit 20B inputs the accumulation model D2 adjusted to satisfy the membrane maintenance condition to the accumulation model input unit 3, and inputs the power consumption model D7 adjusted to satisfy the membrane maintenance condition to the power consumption model input unit 6. It is assumed that the maintenance condition input to the membrane maintenance condition input unit 19 is that the replacement cycle for the separation membrane 31 is 51 days or more. In a case where the concentration of the cleaning liquid used for membrane cleaning is changed as the operating condition, the cleaning cost for the separation membrane 31 varies according to the concentration of the cleaning liquid, and thus the maintenance cost D6 varies.

Hereinafter, specific procedures for the process of changing the operating condition and the process of recalculating the minimum reference value pattern by the operation support device 100B will be described. The computation unit 1 of the operation support device 100B, in a similar manner to that of the operation support device 100A of the first embodiment, calculates the minimum reference value pattern under the current operating condition, and calculates the replacement cycle for the separation membrane 31 based on the calculated minimum reference value pattern. The computation unit 1 inputs the replacement cycle, which is the calculation result, to the result presentation unit 7, and the result presentation unit 7 inputs the replacement cycle to the reference value adjustment unit 20B. The reference value adjustment unit 20B compares the membrane maintenance condition input from the membrane maintenance condition input unit 19 with the replacement cycle as the calculation result.

FIG. 9 is a diagram for explaining the replacement cycle calculated by the operation support device according to the second embodiment without changing the operating condition. FIG. 9 depicts the correspondence relationship between the initial value of the blower output that is the output of the blower 22X, the initial value of "a" in Formula (1), the initial value of "b" in Formula (2), the initial value of "d" in Formula (5), the initial cleaning reference value, the initial replacement reference value, the replacement cycle, and the pattern operation cost. Note that in FIG. 9 and FIGS. 10, 13, and 14 described later, the cleaning reference values and replacement reference values are expressed in percentage.

As illustrated in FIG. 9, if the water treatment facility 23B is operated with the initial value of the blower output, the replacement cycle is 44 days, which is shorter than 51 days specified by the maintenance condition. That is, because the replacement cycle calculated with the initial value of the blower output is shorter than the replacement condition specified by the maintenance condition, the initial value of the blower output does not satisfy the maintenance condition. In this case, the reference value adjustment unit 20B creates the accumulation model D2 and the power consumption model D7 for the case of increasing the blower output. The reference value adjustment unit 20B creates a new accumulation model D2 by updating "b" in Formula (2) and creates a new power consumption model D7 by updating "d" in Formula (5).

The reference value adjustment unit 20B inputs the accumulation model D2 for the case of increasing the blower output to the accumulation model input unit 3, and inputs the power consumption model D7 for the case of increasing the blower output to the power consumption model input unit 6. Then, the computation unit 1 recalculates the minimum reference value pattern.

In this way, the operation support device 100B repeatedly recalculates the minimum reference value pattern while updating models, and determines the models or the maintenance cost D6 that can satisfy the maintenance condition. That is, the computation unit 1 changes the operating condition of the membrane maintenance facility 22 such that it satisfies the maintenance condition, updates at least one of the models and the maintenance cost D6 based on the changed operating condition, and recalculates the cleaning schedule and replacement schedule for the separation membrane 31.

FIG. 10 is a diagram for explaining the replacement cycles calculated by the operation support device according to the second embodiment by changing the operating condition. FIG. 10 depicts the correspondence relationship between the number of replacement cycle calculations, blower output values, "a" in Formula (1), "b" in Formula (2), "d" in Formula (5), cleaning reference values, replacement reference values, replacement cycles, and pattern operation costs.

The number of replacement cycle calculations is the number of times the reference value adjustment unit 20B calculates the replacement cycle. The number of calculations "1" indicates that the replacement cycle is calculated using the initial value of the blower output. The number of calculations "2" indicates that the replacement cycle is recalculated for the first time after the blower output is changed, and the number of calculations "3" indicates that the replacement cycle is further recalculated after the blower output is further changed.

The reference value adjustment unit 20B increases the blower output each time the blower output is calculated. As the blower output increases, "b" in Formula (2) decreases and "d" in Formula (5) increases. The replacement cycle becomes longer as the blower output increases. As illustrated in FIG. 10, the replacement cycle reaches 54 days, which is more than 51 days specified by the maintenance condition, by the fourth calculation of the replacement cycle. The reference value adjustment unit 20B changes the accumulation model D2 using "b" in Formula (2) that has changed, and changes the power consumption model D7 using "d" in the Formula (5).

Upon determining the models that can satisfy the maintenance condition, the reference value adjustment unit 20B inputs the blower output that can satisfy the maintenance condition to the facility control unit 21.

In response to receiving the changed operation condition such as the blower output, the facility control unit 21 calculates the amount of operation for the water treatment facility 23B such that it matches the received operation condition. Because the facility control unit 21 can satisfy the maintenance condition by increasing the blower output for membrane surface aeration by 1.6 times, the facility control unit 21 sends a signal for increasing the amount of operation by 1.6 times to the blower 22X. Thus, the blower 22X increases the amount of membrane surface aeration by 1.6 times. As a result, the water treatment facility 23B can filter the sewage W1 while satisfying the maintenance condition. Note that the reason why the cleaning reference values vary depending on the number of calculations is that replacement cycles can be calculated using different calculation periods, and different calculation periods can lead to different cleaning reference values.

As described above, the second embodiment makes it possible to easily predict the cleaning schedule and replacement schedule for the separation membrane 31 for reducing the pattern operation cost of the separation membrane 31 without the need for reference value input based on specialized knowledge, while satisfying the maintenance condition designated by the operator by controlling the membrane maintenance facility 22.

Third Embodiment

Next, the third embodiment of the present invention will be described with reference to FIGS. 11 to 14. In the second embodiment, the membrane maintenance facility 22 is controlled in order to satisfy the maintenance condition. Alternatively, the water quality of the sewage W1 may be controlled by the pretreatment tank 30A, which is the facility at the pre-stage of membrane separation. In the third embodiment, the operating condition in the pretreatment tank 30A is changed so as to satisfy the maintenance condition designated by the operator, and the minimum reference value pattern satisfying the maintenance condition is calculated.

Figure 11:
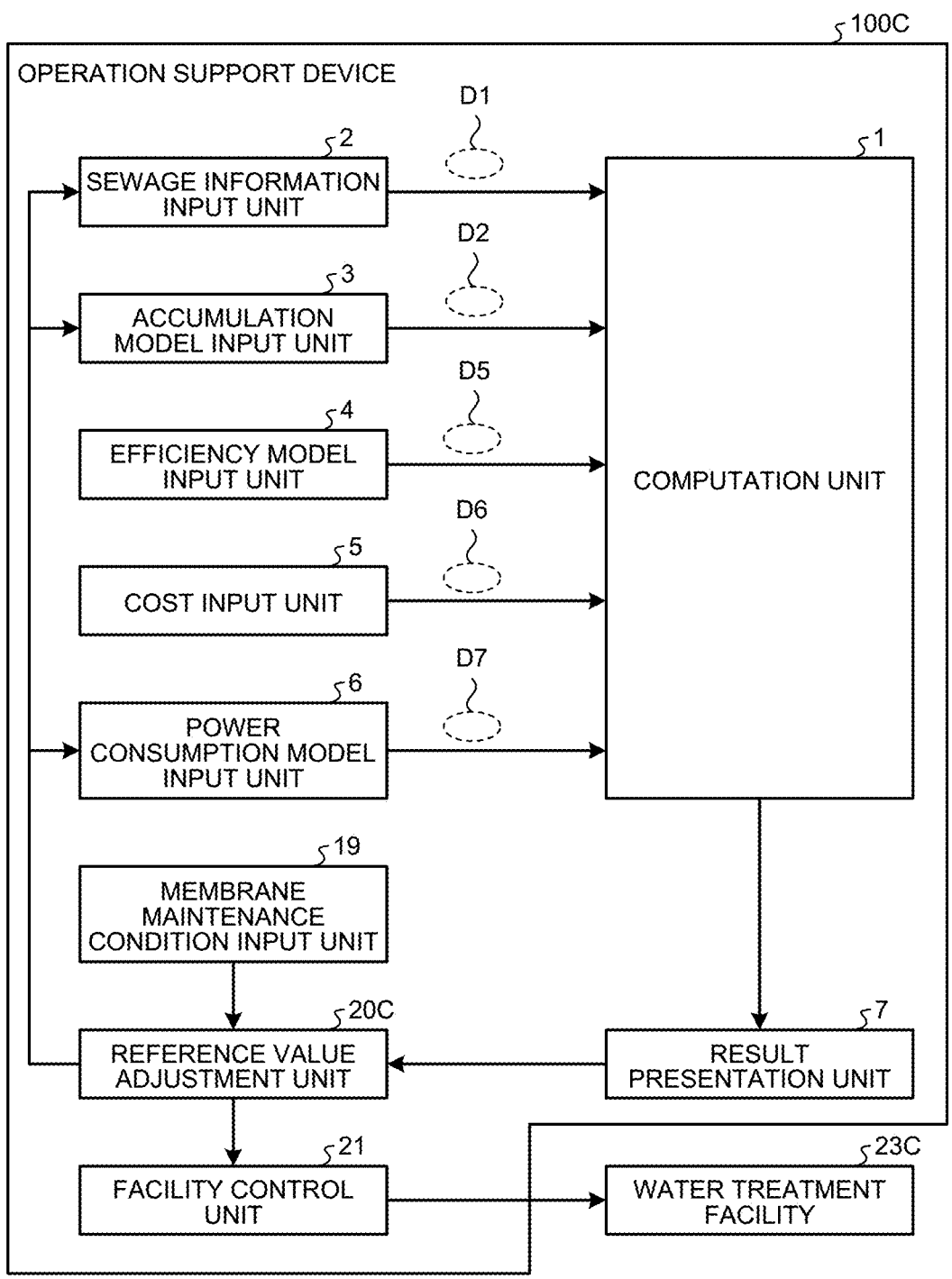
FIG. 11 is a functional configuration diagram of an operation support device according to a third embodiment.

FIG. 11 is a functional configuration diagram of an operation support device according to the third embodiment. Components of the operation support device 100C illustrated in FIG. 11 that achieve the same functions as those of the operation support device 100A or the operation support device 100B are denoted by the same reference signs, and duplicate descriptions are omitted.

The operation support device 100C includes a reference value adjustment unit 20C, instead of the reference value adjustment unit 20B of the operation support device 100B. The reference value adjustment unit 20C is connected to the result presentation unit 7, the membrane maintenance condition input unit 19, and the facility control unit 21. The reference value adjustment unit 20C is also connected to the sewage information input unit 2, the accumulation model input unit 3, and the power consumption model input unit 6. The facility control unit 21 is connected to a water treatment facility 23C.

The reference value adjustment unit 20C acquires the minimum reference value pattern and the maintenance schedule from the result presentation unit 7. The reference value adjustment unit 20C changes the operating condition of the water treatment facility 23C such that the minimum reference value pattern and the maintenance schedule computed by the computation unit 1 satisfy the membrane maintenance condition. The operating condition is a condition that affects at least one of the predicted water quality value D1, the accumulation model D2, and the power consumption model D7. The reference value adjustment unit 20C here sets an operating condition that makes the minimum reference value pattern and the maintenance schedule satisfy the membrane maintenance condition, and sends the set operating condition to the sewage information input unit 2, the accumulation model input unit 3, or the power consumption model input unit 6. For example, the reference value adjustment unit 20C sets a new power consumption model D7 and sends the set power consumption model D7 to the power consumption model input unit 6. The computation unit 1 recalculates the minimum reference value pattern using the changed operating condition.

The reference value adjustment unit 20C repeats the process of changing the operating condition of the water treatment facility 23C and causing the computation unit 1 to calculate the minimum reference value pattern until the calculation result by the computation unit 1 satisfies the membrane maintenance condition.

Upon determining the operating condition that makes the minimum reference value pattern and the maintenance schedule satisfy the membrane maintenance condition, the reference value adjustment unit 20C inputs the determined operating condition to the facility control unit 21.

The facility control unit 21 controls the water treatment facility 23C. The facility control unit 21 of the present embodiment changes the operating condition of the pretreatment tank 30A in accordance with the operating condition from the reference value adjustment unit 20C. An example of a device for which the operating condition is changed is a facility or device for maintaining the state of the pretreatment tank 30A, such as a blower of an aerobic tank for the activated sludge process or a chemical injection pump for freshwater treatment. The following description is based on the premise that the device for which the operating condition is changed is a blower of an aerobic tank.

The operation support device 100C calculates the minimum reference value pattern and the maintenance schedule using a method similar to that of the operation support device 100A. Processing that is performed by the operation support device 100C after the operation support device 100C calculates the minimum reference value pattern and the maintenance schedule will be described. After calculating the minimum reference value pattern and the maintenance schedule, the operation support device 100C changes the operating condition, and recalculates the minimum reference value pattern and the maintenance schedule.

Figure 12:
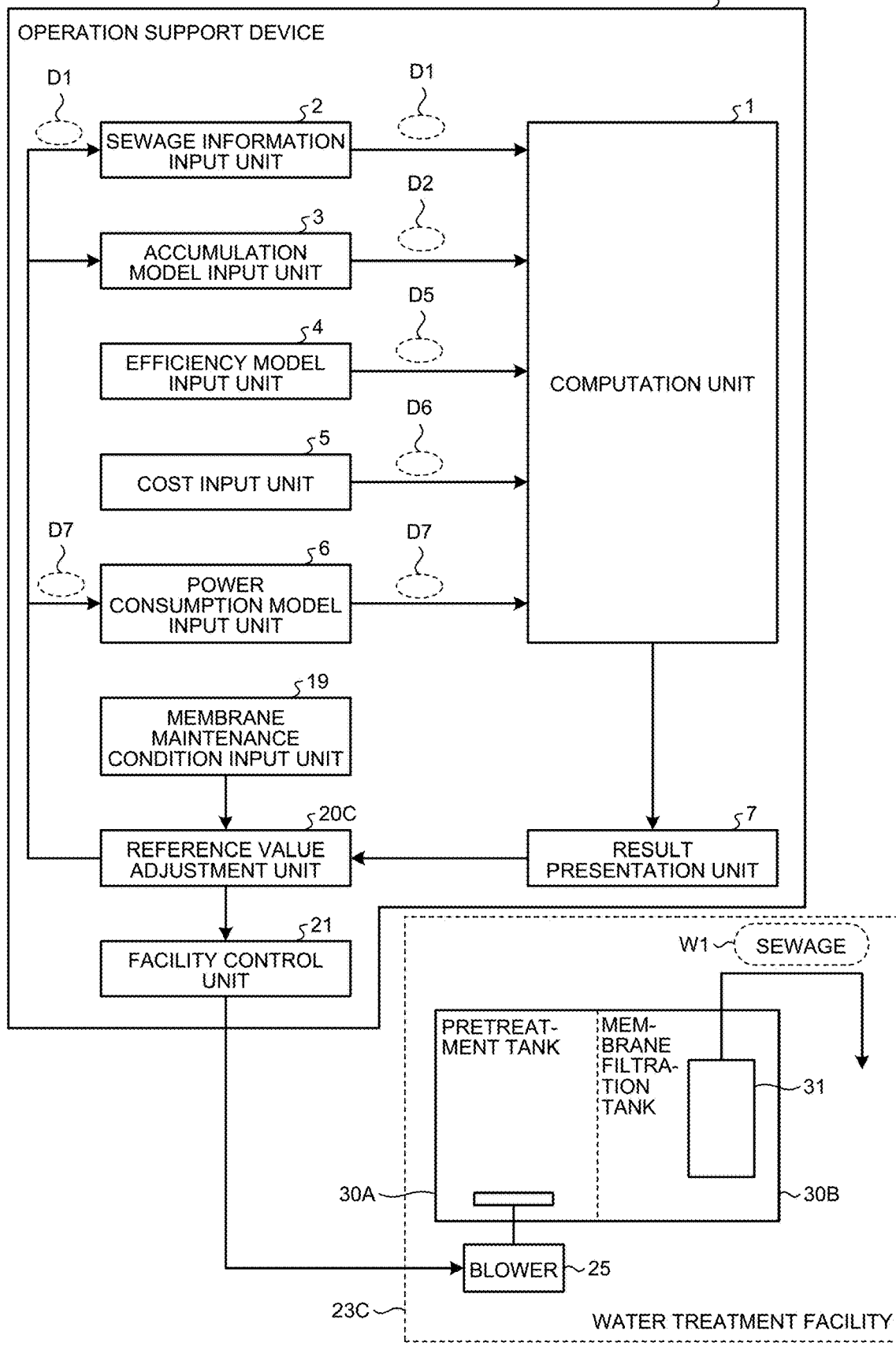
FIG. 12 is a diagram for explaining the process of changing the operating condition and the process of recalculating the minimum reference value pattern by the operation support device according to the third embodiment.

FIG. 12 is a diagram for explaining the process of changing the operating condition and the process of recalculating the minimum reference value pattern by the operation support device according to the third embodiment. Here, consider the case in which the device for which the operating condition is changed is a blower 25 that sends air to an aerobic tank for activated sludge treatment, and the operation support device 100C changes the operating condition of the blower 25 such that the maintenance schedule satisfies the membrane maintenance condition.

The water treatment facility 23C includes the pretreatment tank 30A, the membrane filtration tank 30B, the separation membrane 31, and the blower 25. The pretreatment tank 30A includes an aerobic tank, and the blower 25 sends air to the aerobic tank.

Generally, as the blower output of the aerobic tank increases, the water quality of the sewage W1 improves. In addition, generally, as the blower output increases, the amount of power consumption per unit time increases. Therefore, the operating condition that can be changed by changing the output of the blower 25 is the predicted water quality value D1 and the power consumption model D7. The operation support device 100C uses the models same as those used in the first embodiment by regarding the improvement of the water quality of the sewage W1 flowing into the separation membrane 31 as the reduction of the amount of foulant accumulation. That is, the operation support device 100C uses Formula (1) as the predicted water quality value D1 and uses Formula (5) as the power consumption model D7. The reference value adjustment unit 20C inputs the predicted water quality value D1 adjusted to satisfy the membrane maintenance condition to the sewage information input unit 2, and inputs the power consumption model D7 adjusted to satisfy the membrane maintenance condition to the power consumption model input unit 6. It is assumed that the maintenance condition input to the membrane maintenance condition input unit 19 is that the replacement cycle for the separation membrane 31 is 51 days or more.

Hereinafter, specific procedures for the process of changing the operating condition and the process of recalculating the minimum reference value pattern by the operation support device 100C will be described. The computation unit 1 of the operation support device 100C, in a similar manner to that of the operation support device 100A of the first embodiment, calculates the minimum reference value pattern under the current operating condition, and calculates the replacement cycle for the separation membrane 31 based on the calculated minimum reference value pattern. The computation unit 1 inputs the replacement cycle, which is the calculation result, to the result presentation unit 7, and the result presentation unit 7 inputs the replacement cycle to the reference value adjustment unit 20C. The reference value adjustment unit 20C compares the membrane maintenance condition input from the membrane maintenance condition input unit 19 with the replacement cycle as the calculation result.

FIG. 13 is a diagram for explaining the replacement cycle calculated by the operation support device according to the third embodiment without changing the operating condition. FIG. 13 depicts the correspondence relationship between the initial value of the blower output that is the output of the blower 25, the initial value of "a" in Formula (1), the initial value of "d" in Formula (5), the initial cleaning reference value, the initial replacement reference value, the replacement cycle, and the pattern operation cost.

As illustrated in FIG. 13, if the water treatment facility 23C is operated with the initial value of the blower output, the replacement cycle is 40 days, which is shorter than 51 days specified by the maintenance condition. That is, because the replacement cycle calculated with the initial value of the blower output is shorter than the replacement cycle specified by the maintenance condition, the initial value of the blower output does not satisfy the maintenance condition. In this case, the reference value adjustment unit 20C creates the predicted water quality value D1 and the power consumption model D7 for the case of increasing the blower output. The reference value adjustment unit 20C creates a new predicted water quality value D1 by updating "a" in Formula (1) and creates a new power consumption model D7 by updating "d" in Formula (5).

The reference value adjustment unit 20C inputs the predicted water quality value D1 for the case of increasing the blower output to the sewage information input unit 2, and inputs the power consumption model D7 for the case of increasing the blower output to the power consumption model input unit 6. Then, the computation unit 1 recalculates the minimum reference value pattern.

In this way, the operation support device 100C repeatedly recalculates the minimum reference value pattern while updating models, and determines the predicted water quality value D1 or the power consumption model D7 that can satisfy the maintenance condition. That is, the computation unit 1 changes the operating condition of the blower 25 such that it satisfies the maintenance condition, updates at least one of the predicted water quality value D1 and the power consumption model D7 based on the changed operating condition, and recalculates the cleaning schedule and replacement schedule for the separation membrane 31.

FIG. 14 is a diagram for explaining the replacement cycles calculated by the operation support device according to the third embodiment by changing the operating condition.

FIG. 14 depicts the correspondence relationship between the number of replacement cycle calculations, blower output values, "a" in Formula (1), "d" in Formula (5), cleaning reference values, replacement reference values, replacement cycles, and pattern operation costs.

The reference value adjustment unit 20C increases the blower output each time the blower output is calculated, in a similar manner to the reference value adjustment unit 20B. As the blower output increases, "a" in Formula (1) decreases and "d" in Formula (5) increases. The replacement cycle becomes longer as the blower output increases. As illustrated in FIG. 14, the replacement cycle reaches 59 days, which is more than 51 days specified by the maintenance condition, by the fourth calculation of the replacement cycle. The reference value adjustment unit 20C changes the predicted water quality value D1 using "a" in Formula (1) that has changed, and changes the power consumption model D7 using "d" in the Formula (5).

Upon determining the predicted water quality value D1 and the power consumption model D7 that can satisfy the maintenance condition, the reference value adjustment unit 20C inputs the blower output that can satisfy the maintenance condition to the facility control unit 21.

In response to receiving the changed operation condition such as the blower output, the facility control unit 21 calculates the amount of operation for the water treatment facility 23C such that it matches the received operation condition. Because the facility control unit 21 can satisfy the maintenance condition by increasing the blower output of the blower 25 that sends air to the aerobic tank by 1.38 times, the facility control unit 21 sends a signal for increasing the amount of operation by 1.38 times to the blower 25. Thus, the blower 25 increases the amount of air that is sent to the aerobic tank by 1.38 times. As a result, the water treatment facility 23C can filter the sewage W1 while satisfying the maintenance condition.

As described above, the third embodiment makes it possible to easily predict the cleaning schedule and replacement schedule for the separation membrane 31 for reducing the pattern operation cost of the separation membrane 31 without the need for reference value input based on specialized knowledge, while satisfying the maintenance condition designated by the operator by controlling the device for maintaining the state of the pretreatment tank 30A.

Figure 15:
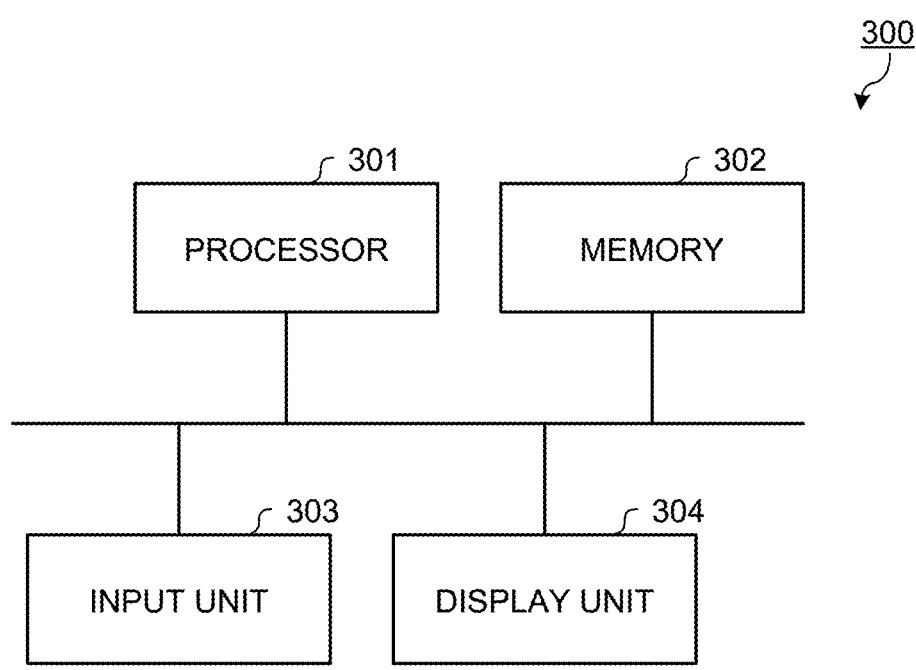
FIG. 15 is a diagram illustrating a hardware configuration for implementing the operation support device according to any of the first to third embodiments.

Here, a hardware configuration for implementing the functions of the operation support devices 100A to 100C according to the first to third embodiments will be described. FIG. 15 is a diagram illustrating a hardware configuration for implementing the operation support device according to any of the first to third embodiments. Because the operation support devices 100A to 100C have a similar hardware configuration, the hardware configuration of the operation support device 100C will be described here.

The operation support device 100C can be implemented by a control circuit 300 illustrated in FIG. 15, that is, a processor 301, a memory 302, an input unit 303, and a display unit 304. The processor 301 is a central processing unit (CPU, also referred to as a central processing device, a processing device, a computation device, a microprocessor, a microcomputer, or a digital signal processor (DSP)), a system large scale integration (LSI), or the like. The memory 302 is a random access memory (RAM), a read only memory (ROM), or the like.

The memory 302 stores a program for executing the function of the computation unit 1, a program for executing the function of the reference value adjustment unit 20C, and a program for executing the function of the facility control unit 21.

The processor 301 receives necessary information via the input unit 303, and reads and executes the programs stored in the memory 302, thereby executing processing by the computation unit 1, the reference value adjustment unit 20C, and the facility control unit 21. It can be said that the programs stored in the memory 302 cause a computer to execute a plurality of instructions corresponding to the procedures or methods of the computation unit 1, the reference value adjustment unit 20C, and the facility control unit 21. The memory 302 is also used as a temporary memory when the processor 301 performs various processes.

The sewage information input unit 2, the accumulation model input unit 3, the efficiency model input unit 4, the cost input unit 5, the power consumption model input unit 6, and the membrane maintenance condition input unit 19 are implemented using the input unit 303. The result presentation unit 7 is implemented using the display unit 304.

The programs executed by the processor 301 may be a computer program product having a computer-readable non-transitory recording medium including a plurality of computer-executable instructions for performing data processing.

Note that the processor 301 and the memory 302 illustrated in FIG. 15 may be replaced with processing circuitry. For example, processing circuitry is a single circuit, a composite circuit, a programmed processor, a parallel programmed processor, an application specific integrated circuit (ASIC), a field-programmable gate array (FPGA), or a combination thereof. Note that the functions of the computation unit 1, the reference value adjustment unit 20C, and the facility control unit 21 may be partially implemented by dedicated hardware and partially implemented by software or firmware.

Fourth Embodiment

Next, the fourth embodiment of the present invention will be described with reference to FIGS. 16 to 21. In the fourth embodiment, reference values are determined before the start of the water treatment operation (design stage) or during the operation of the water treatment facility. That is, the fourth embodiment relates to the case in which the reference value for determining the cleaning schedule (hereinafter referred to as the reference value for cleaning) and the reference value for determining the replacement schedule (hereinafter referred to as the reference value for replacement) for separation membranes for a newly constructed water treatment facility are determined in the design stage before the start of the water treatment operation, or the case in which the reference value for cleaning and the reference value for replacement are redetermined for the water treatment facility in operation. For a newly constructed water treatment facility, the reference value for cleaning and the reference value for replacement are newly determined.

Furthermore, regarding the water treatment facility in operation, conditions for water treatment in the initial operation of the water treatment facility may change due to changes in the water quality of the sewage to be treated or changes in the environment of the water treatment facility. Therefore, for the water treatment facility in operation, the reference value for cleaning and the reference value for replacement are also updated appropriately.

Note that the timing of updating may be any timing such as when each condition such as the condition of sewage changes or when a certain period of time elapses after the previous calculation. The procedure of the present embodiment is repeatedly applied every time the reference value for cleaning and the reference value for replacement need to be recalculated during operation, so that the reference value for cleaning and the reference value for replacement suitable for the state of the water treatment facility can be continuously adopted.

Figure 16:
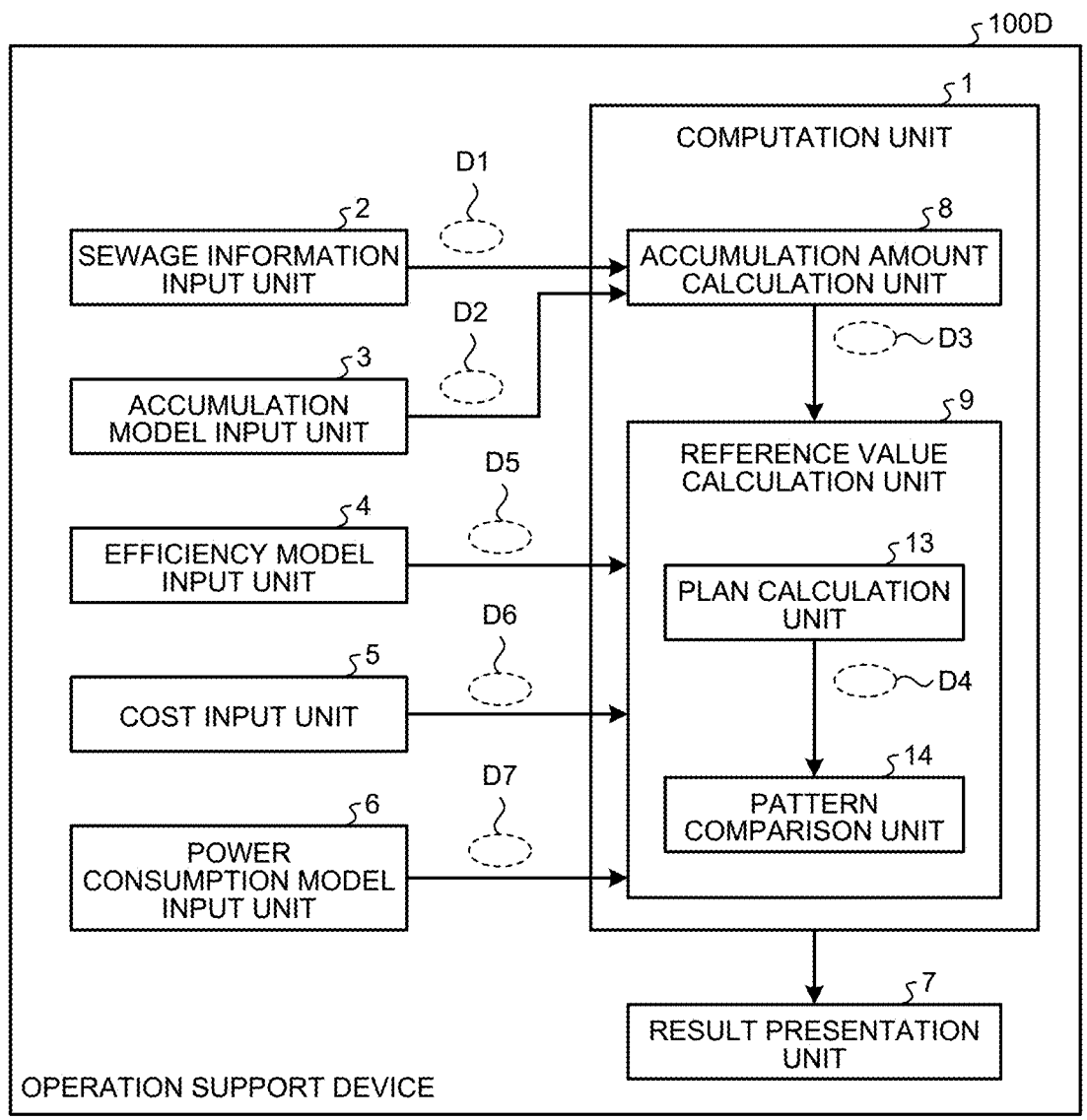
FIG. 16 is a functional configuration diagram of an operation support device according to a fourth embodiment.

FIG. 16 is a functional configuration diagram of an operation support device according to the fourth embodiment. The operation support device 100D is a computer that calculates a first reference value (reference value for cleaning) used for determining whether to clean a separation membrane for water treatment and a second reference value (reference value for replacement) used for determining whether to replace a separation membrane.

The operation support device 100D includes the computation unit 1, the sewage information input unit 2, the accumulation model input unit 3, the efficiency model input unit 4, the cost input unit 5, the power consumption model input unit 6, and the result presentation unit 7.

The sewage information input unit 2, the accumulation model input unit 3, the efficiency model input unit 4, the cost input unit 5, and the power consumption model input unit 6 acquire data and input data to the computation unit 1. Each of these input units may acquire data by any means. Each input unit acquires data by manual data input, data input from external software, input of data acquired from a sensor when the water treatment facility is in operation, or the like.

Each input unit may input data to the computation unit 1 by any means such as network communication or media transfer.

The sewage information input unit 2 acquires the predicted water quality value D1 that is water quality information on the sewage to be subjected to water treatment, and inputs the predicted water quality value D1 to the computation unit 1. The predicted water quality value D1 of the present embodiment is data indicating a time-series change of the water quality of sewage or data indicating a predicted value of the water quality of sewage.

The accumulation model input unit 3 acquires the accumulation model D2 that expresses the amount of foulant accumulation with respect to the water quality, and inputs the accumulation model D2 to the computation unit 1. The accumulation model D2 is a model that expresses the amount of foulant accumulation caused by fouling.

The efficiency model input unit 4 acquires the cleaning efficiency model D5 that is a model of cleaning efficiency, and inputs the cleaning efficiency model D5 to the computation unit 1. The cleaning efficiency model D5 is a model that expresses a change of the deterioration of a separation membrane relative to the number of cleaning events. In the membrane filtration method, a separation membrane is clogged with foulant through continuous use of the separation membrane, and thus the efficiency of filtration treatment (the amount of water that can be filtered in a unit time) decreases as the treatment time elapses. In the membrane filtration method, it is necessary to clean and replace separation membranes on a regular basis in order to remove foulant from membranes.

Generally, the cleaning cost for separation membranes is lower than the replacement cost for separation membranes. Therefore, the first step for dealing with clogging of a separation membrane is to clean the separation membrane. In the cleaning of a separation membrane, the separation membrane is cleaned with a chemical solution or filtrate so that foulant is removed. After the separation membrane is cleaned, the filtration capacity of the separation membrane (the amount of water that the separation membrane can treat) is recovered to some extent.

However, compared with the filtration capacity of a new separation membrane, the filtration capacity and durability of the cleaned separation membrane are low. As the number of times the separation membrane is cleaned increases, the recovery rate of the filtration capacity decreases. When the recovery rate of the filtration capacity becomes so low that the separation membrane can no longer be reused, the separation membrane is replaced. The cleaning efficiency model D5 of the present embodiment expresses the recovery rate of the filtration capacity relative to the number of times the separation membrane is cleaned.

The cost input unit 5 acquires the maintenance cost D6, and inputs the maintenance cost D6 to the computation unit 1. The maintenance cost D6 is the cost required for the maintenance of separation membranes, and includes the cleaning cost, namely the cost required for one cleaning event for a separation membrane, and the replacement cost, namely the cost required for one replacement event for a separation membrane. In the present embodiment, as described above, the cleaning cost includes the price of the chemical solution used for cleaning, and the replacement cost includes the price of separation membranes.

The power consumption model input unit 6 acquires the power consumption model D7, and inputs the power consumption model D7 to the computation unit 1. The power consumption model D7 is a model that expresses the power consumption of the water treatment facility with respect to the blockage rate of a separation membrane. In the present embodiment, one or more of the accumulation model D2, the cleaning efficiency model D5, and the power consumption model D7 may also be referred to as a model.

The computation unit 1 computes a reference value used for calculating the maintenance schedule for separation membranes (cleaning schedule and replacement schedule for separation membranes). The reference value can be, for example, a value of the blockage rate of a separation membrane and the period until the blockage rate reaches that value. Specific examples of the use of the reference value are to clean a separation membrane when the blockage rate thereof reaches A % and to replace a separation membrane when the time until the blockage rate thereof reaches A % is less than B months. The following description is based on the premise that the reference value is a value of the blockage rate and the period until the blockage rate reaches that value.

The computation unit 1 determines the reference value for cleaning and the reference value for replacement such that the operation cost, i.e. the sum of the maintenance cost D6 and the power cost for water treatment calculated using the predicted water quality value D1, the accumulation model D2, the cleaning efficiency model D5, and the power consumption model D7, has the minimum value, and calculates the cleaning schedule and replacement schedule for separation membranes using the determined reference values. The computation unit 1 includes the accumulation amount calculation unit 8 and the reference value calculation unit 9, and outputs computation results to the result presentation unit 7.

The accumulation amount calculation unit 8 uses the predicted water quality value D1 and the accumulation model D2 to calculate the time-series change D3 of the fouling accumulation amount that occurs thereafter. The time-series change D3 of the fouling accumulation amount is data indicating a temporal change in the fouling accumulation amount, which is the amount of foulant accumulation. The fouling accumulation amount corresponds to the blockage rate of a separation membrane. Therefore, the time-series change D3 of the fouling accumulation amount corresponds to the time-series change of the blockage rate of a separation membrane. The accumulation amount calculation unit 8 sends the time-series change D3 of the fouling accumulation amount to the reference value calculation unit 9.

The reference value calculation unit 9 includes the plan calculation unit 13 and the pattern comparison unit 14. The plan calculation unit 13 calculates the plan set D4 that expresses the schedule for cleaning and replacement. The plan calculation unit 13 first creates a plurality of temporary reference values for cleaning as candidates for the reference value for cleaning. Temporary reference values for cleaning are temporary values of the reference value for cleaning. The reference value calculation unit 9 further creates a plurality of temporary reference values for replacement as candidates for the reference value for replacement. Temporary reference values for replacement are temporary values of the reference value for replacement. Then, the reference value calculation unit 9 creates a set of temporary reference value pairs including all these combinations. That is, the reference value calculation unit 9 creates a set of temporary reference value pairs that are all combinations of temporary reference values for cleaning and temporary reference values for replacement.

The reference value calculation unit 9 creates a set of temporary reference value pairs as a temporary reference value pattern set Px (wash, change). Hereinafter, the set of temporary reference value pairs created by the reference value calculation unit 9 may be referred to as the temporary reference value pattern set Px. For example, suppose that the criterion for cleaning is the blockage rate of a separation membrane, temporary reference values for cleaning are three types of A %, B %, and C %, the criterion for replacement is the blockage rate of a separation membrane after cleaning, and reference values for replacement are three types of a %, b %, and c %. In this case, the temporary reference value pattern set Px includes nine elements of (A %, a %), (A %, b %), (A %, c %), (B %, a %), (B %, b %), (B %, c %), (C %, a %), (C %, b %), and (C %, c %).

Then, the plan calculation unit 13 calculates a separation membrane operation plan for each element of the temporary reference value pattern set Px using the time-series change D3 of the fouling accumulation amount and the cleaning efficiency model D5. In the present embodiment, a set of operation plans for temporary reference value patterns is referred to as the plan set D4. The plan set D4 is maintenance plans that contain the cleaning schedule and replacement schedule for separation membranes. The plan calculation unit 13 sends the calculated plan set D4 to the pattern comparison unit 14. Hereinafter, elements of temporary reference value patterns may be referred to as patterns.

The pattern comparison unit 14 uses the plan set D4, the maintenance cost D6, and the power consumption model D7 to calculate the operation cost for each plan. Because the plans in the plan set D4 differ in the number of cleaning events, the number of replacement events, or the change of the blockage rate of a separation membrane in a certain operation period, the operation costs differ between the plans. Here, a certain operation period means the period for calculating an operation cost, and the reliability of a calculation result improves as the operation period becomes longer.

In other words, if the period for comparing operation costs is too short, a non-optimal reference value pattern may be adopted. Therefore, the pattern comparison unit 14 compares operation costs for reference value patterns in a period including at least one separation membrane replacement event after starting the use of a separation membrane or in a period including at least two separation membrane replacement events.

In other words, the pattern comparison unit 14 compares operation costs in a period longer than the replacement cycle for separation membranes. Then, the pattern comparison unit 14 compares the calculated operation costs for the plans and determines the minimum operation cost. The pattern comparison unit 14 extracts, from the operation cost calculation results, the pair of temporary reference values used for the calculation of the minimum operation cost plan, and sends the pair of temporary reference values to the result presentation unit 7 as the combination of the reference value for cleaning and the reference value for replacement.

The result presentation unit 7 presents the user with the combination of the reference value for cleaning and the reference value for replacement that achieves the minimum operation cost. The result presentation unit 7 may present the user with the operation cost itself. Further, the result presentation unit 7 may present the user with the operation plan that uses the reference value for cleaning and the reference value for replacement. The presentation means by the result presentation unit 7 may be any means such as displaying on a display or printing on paper.

In the fourth embodiment, the result presentation unit 7 displays information similar to that in the first embodiment.

Specifically, the result presentation unit 7 displays a reference value for cleaning such as "when the membrane is XX % blocked" as the cleaning schedule for separation membranes. The result presentation unit 7 also displays a reference value for replacement such as "when the transmembrane pressure difference after cleaning reaches YY % or more" as the replacement schedule for separation membranes.

The result presentation unit 7 may display the calculation result in the form of converted values representing information to be presented to the operator of the water treatment facility. In this case, the pattern comparison unit 14 converts the calculation result into information to be presented to the operator of the water treatment facility. Information to be presented to the operator of the water treatment facility is, for example, the date of the next cleaning or replacement event and the operation cost for the case of executing the separation membrane operation plan.

For displaying the date of the next and subsequent cleaning or replacement events, the result presentation unit 7 displays the schedule of cleaning ahead such as "Za days later, Zb days later, and Zc days later", and the schedule of replacement ahead such as "Zd days later, Ze days later, and Zf days later".

Next, each calculation performed by the accumulation amount calculation unit 8, the plan calculation unit 13, and the pattern comparison unit 14 will be described using a specific example. The accumulation amount calculation unit 8 calculates the time-series change D3 of the fouling accumulation amount. The fouling accumulation amount is almost proportional to the inflow load of sewage.

Therefore, the accumulation amount calculation unit 8 can use a proportional expression as the accumulation model D2, for example. Therefore, in a case where the predicted water quality value D1 of the input load is $X_t$ and a proportional expression is used as the accumulation model D2, the time-series change D3 of the fouling accumulation amount V(t) that is calculated by the accumulation amount calculation unit 8 is expressed as Formula (1) described in the first embodiment.

Instead of a proportional expression such as Formula (1) that is used here for simplicity, Ruth's equation represented by Formula (3) in the first embodiment or the like may be used for the accumulation model D2. In addition, prediction data for water quality changes may be used as the predicted water quality value D1.

The plan calculation unit 13 calculates the plan set D4 for separation membranes using Formula (1), which is the time-series change D3 of the accumulation amount, the temporary reference value pattern set Px, and the cleaning efficiency model D5.

An example of the temporary reference value pattern set Px is illustrated in FIG. 17. FIG. 17 is a diagram illustrating an example of a temporary reference value pattern set used in the operation support device according to the fourth embodiment. FIG. 17 depicts the temporary reference value pattern set Px for the case that the blockage rate of a separation membrane is adopted as the criterion for cleaning and the blockage rate of a separation membrane after cleaning is adopted as the criterion for replacement. As illustrated in FIG. 17, the temporary reference value pattern set Px includes nine temporary reference value patterns Ax to Ix.

The cleaning efficiency model D5 is a model similar to the cleaning efficiency model D5 described in the first embodiment. That is, the cleaning efficiency model D5 is a model that expresses the phenomenon that a separation membrane deteriorates due to repeated cleaning. For example, in a case where a model in which the efficiency of separation membrane cleaning decreases exponentially with respect to the number of cleaning events n for the separation membrane is used as the separation membrane cleaning efficiency model D5, the efficiency of separation membrane cleaning $R_{ef}(n)$ can be expressed as Formula (4) described in the first embodiment. In Formula (4), "c" is the base of the exponential function.

An example of the plan set D4 calculated by the plan calculation unit 13 is illustrated in FIG. 18. FIG. 18 is a diagram illustrating an example of a time-series change of the blockage rate calculated by the operation support device according to the fourth embodiment. In practice, operation plans, i.e. a total of nine operation plans, are calculated for all elements of the temporary reference value pattern set Px illustrated in FIG. 17. However, FIG. 18 depicts only three patterns Ax, Ex, and Ix for simplicity of the drawing. The horizontal axis of the graph depicted in FIG. 18 represents the time that elapses after the separation membrane starts to filter sewage, and the vertical axis represents the blockage rate of the separation membrane.

In FIG. 18, the change transition of the blockage rate for pattern Ax is denoted by change transition PAx, the change transition of the blockage rate for pattern Ex is denoted by change transition PEx, and the change transition of the blockage rate for pattern Ix is denoted by change transition PIx. Focusing on the first cleaning event, it can be seen that the cleaning in pattern Ax is performed at a stage where the blockage rate is low, and the cleaning in pattern Ix is performed at a stage where the blockage rate is high.

The pattern comparison unit 14 uses the plan set D4, the maintenance cost D6, and the power consumption model D7 to calculate the operation cost in a certain operation period for each plan included in the plan set D4. The pattern comparison unit 14 determines the minimum operation cost of the calculated operation costs, and acquires the temporary reference value pattern corresponding to the minimum operation cost.

The maintenance cost D6 is, for example, a cleaning cost of Ay yen for one cleaning event and a replacement cost of By yen for one replacement event. In a case where cleaning is performed a times and replacement is performed b times within a certain operation period, the maintenance cost $\text{Cost}_{wash,change}(t)$ can be expressed as Formula (6) below.

[Math. 6]

$$\text{Cost}_{wash,change}(t) = \int_0^t Ay*a + By*b \qquad \text{Formula (6)}$$

In a case where a proportional expression with respect to the blockage rate is used as the power consumption model D7, the power cost $\text{Cost}_w(t)$ for water treatment can be expressed as Formula (7) below. Here, "d" is a proportional constant.

[Math. 7]

$$\text{Cost}_w(t) = d*R(t) \qquad \text{Formula (7)}$$

From these Formulas (6) and (7), the operation cost for a temporary reference value pattern in a certain operation period can be expressed as Formula (8) below.

[Math. 8]

$$\text{Cost}_{total}(t) = \text{Cost}_{wash,change}(t) + \text{Cost}_w(t) \qquad \text{Formula (8)}$$

Here, for calculating an operation cost, the pattern comparison unit 14 sets a certain operation period as the calculation period used for calculating the operation cost. In this case, a period sufficiently longer than the replacement cycle for separation membranes is used as described above.

In other words, the pattern comparison unit 14 sets the calculation period based on the replacement cycle for separation membranes. The replacement cycle for separation membranes is the period from the replacement event for a separation membrane to the next replacement event. As the calculation period, the pattern comparison unit 14 may use a period designated by an instruction from the user, or may use an initial value set in advance.

Here, the difference in determination result between the case of a short calculation period such as a calculation period T1x (FIG. 18) and the case of a calculation period T2x (FIG. 18) longer than the calculation period T1x will be described. An example of the calculation period T1x is 240 days, and an example of the calculation period T2x is 300 days. The present embodiment is based on the premise that the unit of periods is "day", but any unit of periods may be used such as "week" or "month".

FIG. 19 is a diagram illustrating the relationship between calculation periods used by the operation support device according to the fourth embodiment to calculate pattern operation costs and calculation results of pattern operation costs. The calculation results of FIG. 19 contain the calculation results for patterns Ax, Ex, and Ix in the case that the operation cost calculation period is 240 days and the calculation results for patterns Ax, Ex, and Ix in the case that the operation cost calculation period is 300 days.

The calculation results here are "the number of cleaning events", "the number of replacement events", "electricity expense", and "operation cost". "The number of cleaning events" is the number of times the separation membrane is cleaned. "The number of replacement events" is the number of times the separation membrane is replaced. "Electricity expense" is the electricity expense for the filtration treatment corresponding to the calculation period. The calculation period T1x=240 days is shorter than the longest replacement cycle in the compared patterns.

Specifically, "calculation period T1x<(replacement cycle for the case of pattern Ix)" is satisfied. Therefore, the determination results differ between the case of the calculation period T1x=240 days and the case of the calculation period T2x=300 days. Pattern Ex has the minimum operation cost in the case of the calculation period T1x=240 days, whereas pattern Ix has the minimum operation cost in the case of the calculation period T2x=300 days.

Because the reliability of calculation results increases as the calculation period for operation costs becomes longer, the reliability of the calculation results in the case of the calculation period T2x=300 days is higher than that in the case of the calculation period T1x=240 days. That is, pattern Ix is considered to have the minimum operation cost. Therefore, the pattern comparison unit 14 does not adopt a calculation period, such as the calculation period T1x=240 days, that makes the determination results different from those with the calculation period T2x=300 days.

The pattern comparison unit 14 uses, as the calculation period for operation costs, a length that is at least twice the longest replacement cycle in the patterns Ax to Ix to be compared. Note that it is desirable to extend the calculation period for operation costs and recalculate operation costs repeatedly until the determination results converge.

The pattern comparison unit 14 compares the operation costs calculated using a sufficiently long calculation period, and determines the temporary reference value pattern that achieves the minimum operation cost.

Figure 20:
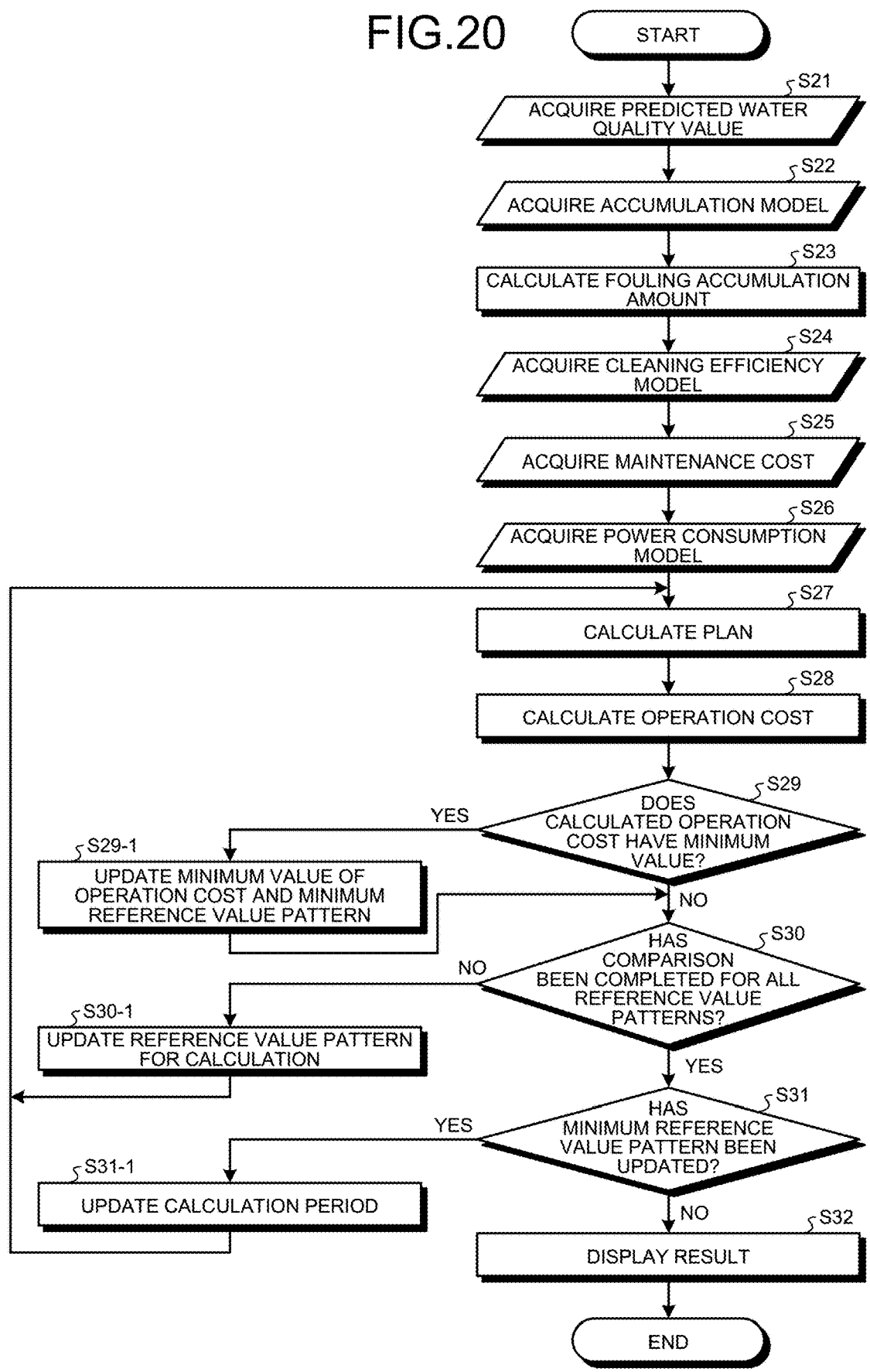
FIG. 20 is a flowchart illustrating the procedure for computation processing by a computation unit according to the fourth embodiment.

Next, the procedure for computation processing by the computation unit 1 will be described. FIG. 20 is a flowchart illustrating the procedure for computation processing by the computation unit according to the fourth embodiment. This procedure is the same as the procedure for the case that the computation unit 1 is executed as a program.

The operation support device 100D prepares the pattern set P, which is a set of reference value patterns, in advance before the computation unit 1 starts computation. The pattern set P includes various reference values. Further, the operation support device 100D determines the initial value of the calculation period in advance.

The computation unit 1 acquires the predicted water quality value D1, which is information on sewage, and the accumulation model D2 (steps S21 and S22). The computation unit 1 calculates the future time-series change D3 of the fouling accumulation amount based on the predicted water quality value D1 and the accumulation model D2 (step S23).

After that, the computation unit 1 acquires the separation membrane cleaning efficiency model D5, the maintenance cost D6, and the power consumption model D7 for the water treatment facility with respect to the blockage rate of a separation membrane (steps S24, S25, and S26).

The computation unit 1 acquires the values of the first reference value pattern from the pattern set P, calculates a cleaning plan and a replacement plan that are plans in the calculation period (step S27), and calculates an operation cost based on the calculated cleaning plan and replacement plan (step S28). Then, the computation unit 1 compares the value of the operation cost calculated in step S28 with the minimum value of the operation cost in the previous calculation results. The computation unit 1 determines whether the operation cost calculated in step S28 has the minimum value (step S29).

When the operation cost calculated in step S28 has the minimum value (step S29: Yes), the computation unit 1 updates and records the minimum value of the operation cost and the reference value pattern used for the calculation of the minimum operation cost (step S29-1). Note that in the case of the initial calculation of an operation cost, the value of the operation cost calculated in step S28 is necessarily the minimum value. The computation unit 1 performs step S30 after step S29-1.

When the operation cost calculated in step S28 does not have the minimum value (step S29: No), the computation unit 1 determines whether there is a reference value pattern in the pattern set P for which the calculation of the operation cost has not been completed. That is, the computation unit 1 determines whether the comparison with the minimum value has been completed for all the reference value patterns (step S30).

When there is a reference value pattern for which the calculation has not been completed (step S30: No), the computation unit 1 acquires one reference value pattern for which the calculation has not been completed, and updates the reference value pattern for calculation (step S30-1). Then, the computation unit 1 uses the new reference value pattern to perform steps S27 to S30 again.

The computation unit 1 calculates the operation costs for all the reference value patterns, and repeats steps S30-1 and S27 to S30 until the comparison between the calculated operation costs and the minimum value is completed. After the operation costs for all the reference value patterns are calculated and compared with the minimum value (step S30: Yes), the computation unit 1 determines whether the reference value pattern that achieves the minimum operation cost in the calculation period for the calculation of the current operation cost is the same as the reference value pattern having the minimum operation cost in the calculation of the previous operation cost.

The minimum reference value pattern derived in the previous calculation is the minimum reference value pattern calculated in the previous loop of steps S27 to S30, and the reference value pattern derived in the current calculation is the minimum reference value pattern calculated in the current loop of steps S27 to S30.

When the current minimum reference value pattern is different from the previous minimum reference value pattern, the computation unit 1 updates the latest minimum reference value pattern to the current minimum reference value pattern. The computation unit 1 determines whether the minimum reference value pattern has been updated (step S31).

In response to determining that the minimum reference value pattern has been updated (step S31: Yes), that is, the current minimum reference value pattern is different from the previous minimum reference value pattern, the computation unit 1 updates the current calculation period T to a new calculation period T'=(T+ΔT) (step S31-1). Then, the computation unit 1 executes steps S27 to S31 using the new calculation period T'.

In response to determining that the minimum reference value pattern has not been updated (step S31: No), that is, the current minimum reference value pattern is the same as the previous minimum reference value pattern, the computation unit 1 determines that the minimum reference value patterns have converged. Upon determining that the minimum reference value patterns have converged, the computation unit 1 sends the current or previous minimum reference value pattern to the result presentation unit 7. Thus, the result presentation unit 7 displays the current or previous minimum reference value pattern as a calculation result (step S32).

Figure 21:
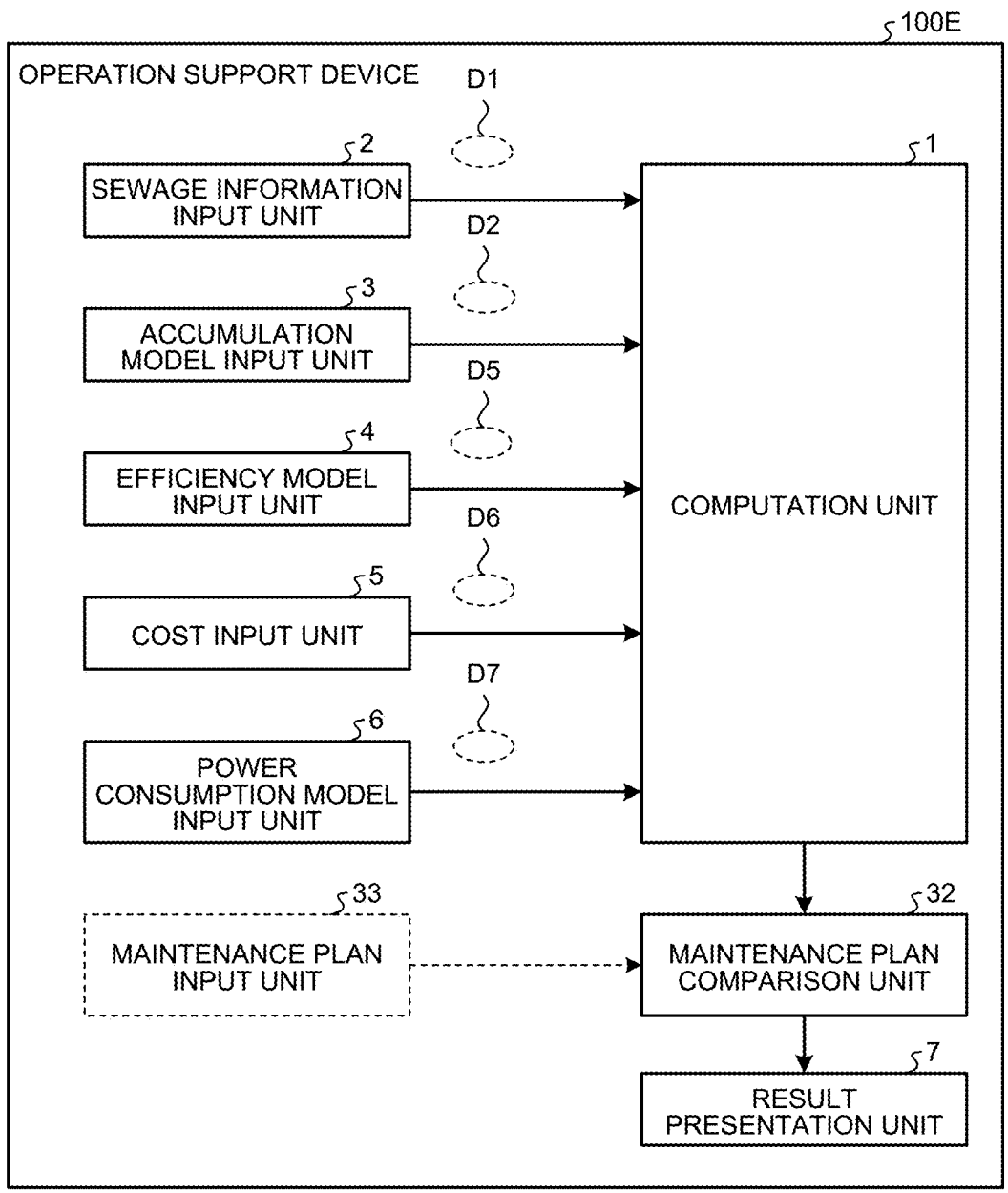
FIG. 21 is a diagram illustrating another configuration example of the operation support device according to the fourth embodiment.

FIG. 21 is a diagram illustrating another configuration example of the operation support device according to the fourth embodiment. FIG. 21 depicts the functional configuration of an operation support device 100E. The operation support device 100E is applied, for example, when redetermining the reference value for cleaning and the reference value for replacement for the water treatment facility in operation. The operation support device 100E includes a maintenance plan comparison unit 32 in addition to the components provided in the operation support device 100D.

The operation support device 100E may or may not include a maintenance plan input unit 33. The maintenance plan input unit 33 receives the current maintenance plan input by an external device or the user, and sends the current maintenance plan to the maintenance plan comparison unit 32.

The maintenance plan comparison unit 32 compares the maintenance plan currently adopted by the water treatment facility with a new maintenance plan calculated under new conditions, and sends the maintenance plan with a lower cost to the result presentation unit 7.

In a case where the maintenance plan currently adopted by the water treatment facility is the maintenance plan calculated by the operation support device 100E, the maintenance plan comparison unit 32 receives information on the current maintenance plan from the computation unit 1 (reference value calculation unit 9). In a case where the maintenance plan currently adopted by the water treatment facility is not the maintenance plan calculated by the operation support device 100E, the operation support device 100E uses the maintenance plan input unit 33. In this case, the maintenance plan input unit 33 receives the currently adopted maintenance plan from an external device or the user, and inputs the currently adopted maintenance plan to the maintenance plan comparison unit 32.

As described above, in the fourth embodiment, the reference value pattern is determined such that the operation cost, i.e. the sum of the power cost for separation treatment, the cleaning cost for separation membranes, and the replacement cost for separation membranes during the operation of separation membranes, has the minimum value. This makes it possible to easily predict the cleaning schedule and replacement schedule for separation membranes for reducing the operation cost of separation membranes without the need for reference value input based on specialized knowledge.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1 computation unit; 2 sewage information input unit; 3 accumulation model input unit; 4 efficiency model input unit; 5 cost input unit; 6 power consumption model input unit; 7 result presentation unit; 8 accumulation amount calculation unit; 9 reference value calculation unit; 13 plan calculation unit; 14 pattern comparison unit; 19 membrane maintenance condition input unit; 20B, 20C reference value adjustment unit; 21 facility control unit; 22 membrane maintenance facility; 22X, 25 blower; 23B, 23C water treatment facility; 30A pretreatment tank; 30B membrane filtration tank; 31 separation membrane; 100A to 100E operation support device; D1 predicted water quality value; D2 accumulation model; D3 time-series change; D4 plan set; D5 cleaning efficiency model; D6 maintenance cost; D7 power consumption model; W1 sewage.

The invention claimed is:

1. An operation support device comprising
a computer to:
store a cleaning efficiency model that expresses a deterioration of a separation membrane relative to a number of cleaning events, the separation membrane being configured to remove a removal target from sewage;
calculate, using the stored cleaning efficiency model, the deterioration of the separation member based on a number of cleaning events having been performed on the separation member;
calculate a cost of separation treatment based on the calculated deterioration of the separation membrane;
calculate an operation cost using the calculated cost of separation treatment, a cleaning cost for one cleaning event for the separation membrane, and a replacement cost for one replacement event for the separation membrane, the operation cost being a sum of the cost of separation treatment, a cleaning cost for the separation membrane, and a replacement cost for the separation membrane in an operation period of the separation membrane, the operation period of the separation membrane being a period longer than a replacement cycle for separation membranes;
determine a first reference value and a second reference value such that the calculated operation cost has a minimum value, the first reference value being used for determining whether to clean the separation membrane, the second reference value being used for determining whether to replace the separation membrane; and calculate a cleaning schedule and a replacement schedule for the separation membrane using the first reference value and the second reference value determined, wherein the computer calculates the operation cost using
- water quality information on the sewage including a concentration of the removal target and a flow rate,
- an accumulation model that expresses an amount of foulant accumulation on a membrane surface of the separation membrane,
- the cleaning efficiency model,
- a maintenance cost including the cleaning cost for one cleaning event and the replacement cost for one replacement event, and
- a power consumption model that expresses a power consumption that depends on a blockage rate of the separation membrane in a water treatment facility that performs the separation treatment, and wherein the computer
- changes an operating condition of a facility or device for maintaining a state of the separation membrane such that the operating condition satisfies a maintenance condition that is a condition for maintenance of the separation membrane,
- updates at least one of the accumulation model, the cleaning efficiency model, the maintenance cost, and the power consumption model based on the operating condition changed, and
- recalculates the cleaning schedule and the replacement schedule.

2. The operation support device according to claim 1, wherein the computer
changes an operating condition of a facility or device that is used for treatment at a pre-stage of the separation treatment such that the operating condition satisfies a maintenance condition that is a condition for maintenance of the separation membrane, updates at least one of the water quality information, the accumulation model, and the power consumption model based on the operating condition changed, and calculates the cleaning schedule and the replacement schedule.

3. The operation support device according to claim 1, wherein the computer
calculates the operation cost in the operation period by calculating a time-series change of the blockage rate of a membrane using the first reference value and the second reference value and calculating the cost of separation treatment based on the time-series change of the blockage rate.

4. The operation support device according to claim 1, wherein the computer
determines the first reference value and the second reference value by calculating a plurality of the operation costs in the operation period for combinations of a plurality of first temporary reference values that are temporary values of the first reference value and a plurality of second temporary reference values that are temporary values of the second reference value and comparing the plurality of operation costs.

5. An operation support method comprising:

calculating a cost of separation treatment that depends on a deterioration of a separation membrane using a cleaning efficiency model that expresses a deterioration of the separation membrane relative to the number of cleaning events, the separation membrane being configured to remove a removal target from sewage;

calculating an operation cost using the cost of separation treatment, a cleaning cost for one cleaning event for the separation membrane, and a replacement cost for one replacement event for the separation membrane, the operation cost being a sum of the cost of separation treatment, a cleaning cost for the separation membrane, and a replacement cost for the separation membrane in an operation period of the separation membrane, the operation period of the separation membrane being a period longer than a replacement cycle for separation membranes, and determining a first reference value and a second reference value such that the operation cost has a minimum value, the first reference value being used for determining whether to clean the separation membrane, the second reference value being used for determining whether to replace the separation membrane;

calculating a cleaning schedule and a replacement schedule for the separation membrane using the first reference value and the second reference value determined, wherein the calculating the operation cost is performed by using:
- water quality information on the sewage including a concentration of the removal target and a flow rate,
- an accumulation model that expresses an amount of foulant accumulation on a membrane surface of the separation membrane,
- the cleaning efficiency model,
- a maintenance cost including the cleaning cost for one cleaning event and the replacement cost for one replacement event, and
- a power consumption model that expresses a power consumption that depends on a blockage rate of the separation membrane in a water treatment facility that performs the separation treatment, the method further comprising:
changing an operating condition of a facility or device for maintaining a state of the separation membrane such that the operating condition satisfies a maintenance condition that is a condition for maintenance of the separation membrane;

updating at least one of the accumulation model, the cleaning efficiency model, the maintenance cost, and the power consumption model based on the operating condition changed; and recalculating the cleaning schedule and the replacement schedule.

6. The operation support device according to claim 2, wherein the computer
calculates the operation cost in the operation period by calculating a time-series change of the blockage rate of a membrane using the first reference value and the second reference value and calculating the cost of separation treatment based on the time-series change of the blockage rate.

7. The operation support device according to claim 2, wherein the computer
determines the first reference value and the second reference value by calculating a plurality of the operation costs in the operation period for combinations of a plurality of first temporary reference values that are temporary values of the first reference value and a plurality of second temporary reference values that are temporary values of the second reference value and comparing the plurality of operation costs.

8. The operation support device according to claim 3, wherein the computer determines the first reference value and the second reference value by calculating a plurality of the operation costs in the operation period for combinations of a plurality of first temporary reference values that are temporary values of the first reference value and a plurality of second temporary reference values that are temporary values of the second reference value and comparing the plurality of operation costs.

9. The operation support device according to claim 6, wherein the computer determines the first reference value and the second reference value by calculating a plurality of the operation costs in the operation period for combinations of a plurality of first temporary reference values that are temporary values of the first reference value and a plurality of second temporary reference values that are temporary values of the second reference value and comparing the plurality of operation costs.

* * * * *